(12) United States Patent
Newhouse et al.

(10) Patent No.: US 11,063,297 B2
(45) Date of Patent: Jul. 13, 2021

(54) ELECTROCHEMICAL CELL AND ELECTROLYTE FOR SAME

(71) Applicant: Viking Power Systems Pte. Ltd., Singapore (SG)

(72) Inventors: Jocelyn M. Newhouse, Somerville, MA (US); Robert Ellis Doe, Medfield, MA (US); Craig M. Downie, Waltham, MA (US); Robert E. Jilek, Belmont, MA (US); Matthew J. Trahan, Franklin, MA (US)

(73) Assignee: Viking Power Systems Pte, Ltd., Singapore (SG)

( * ) Notice: Subject to any disclaimer, the term of this patent is extended or adjusted under 35 U.S.C. 154(b) by 14 days.

(21) Appl. No.: 16/226,333

(22) Filed: Dec. 19, 2018

(65) Prior Publication Data

US 2019/0198932 A1 Jun. 27, 2019

Related U.S. Application Data

(60) Provisional application No. 62/609,144, filed on Dec. 21, 2017.

(51) Int. Cl.
  *H01M 10/0569* (2010.01)
  *H01M 4/13* (2010.01)
  *H01M 10/052* (2010.01)

(52) U.S. Cl.
  CPC ......... *H01M 10/0569* (2013.01); *H01M 4/13* (2013.01); *H01M 10/052* (2013.01); *H01M 2300/0034* (2013.01)

(58) Field of Classification Search
None
See application file for complete search history.

(56) References Cited

U.S. PATENT DOCUMENTS

| | | | |
|---|---|---|---|
| 6,168,884 B1 | 1/2001 | Neudecker et al. |
| 6,258,478 B1 | 7/2001 | Kim |
| 6,402,795 B1 | 6/2002 | Chu et al. |
| 6,706,447 B2 | 3/2004 | Gao et al. |
| 7,776,465 B1 | 8/2010 | Hatazawa et al. |
| 7,883,797 B2 | 2/2011 | Kishi et al. |
| 8,460,808 B2 | 6/2013 | Toia et al. |
| 8,715,865 B2 | 5/2014 | Xu et al. |
| 8,834,180 B2 | 9/2014 | Woo et al. |

(Continued)

FOREIGN PATENT DOCUMENTS

| | | |
|---|---|---|
| EP | 3118917 B1 | 1/2017 |
| JP | 2008218387 A * | 9/2008 |

(Continued)

OTHER PUBLICATIONS

USPTO; Non-Final Office Action dated Mar. 29, 2017 in U.S. Appl. No. 14/966,100.

(Continued)

*Primary Examiner* — Daniel S Gatewood
(74) *Attorney, Agent, or Firm* — Downs Rachlin Martin PLLC

(57) ABSTRACT

An electrolyte, an electrochemical cell including the electrolyte, and a battery including the electrochemical cell are disclosed. Exemplary electrolytes allow for electrochemical cells and batteries with relatively high efficiency and stability that can be charged to relatively high voltages.

17 Claims, 12 Drawing Sheets

(56) References Cited

U.S. PATENT DOCUMENTS

| | | | |
|---|---|---|---|
| 8,865,350 | B2 | 10/2014 | Yamada et al. |
| 9,114,382 | B2 | 8/2015 | Visconti et al. |
| 9,190,696 | B2 | 11/2015 | He et al. |
| 9,887,415 | B2 | 2/2018 | Fischer et al. |
| 2007/0231707 | A1 | 10/2007 | Abe et al. |
| 2009/0023074 | A1 | 1/2009 | Matsui |
| 2009/0035662 | A1 | 2/2009 | Scott et al. |
| 2010/0227225 | A1 | 9/2010 | Segawa |
| 2012/0214073 | A1 | 8/2012 | Iwaya |
| 2013/0059178 | A1 | 3/2013 | Ihara et al. |
| 2013/0108932 | A1 | 5/2013 | Onozaki |
| 2013/0171514 | A1 | 7/2013 | Mio et al. |
| 2016/0006081 | A1 | 1/2016 | Eaglesham et al. |
| 2016/0172660 | A1 | 6/2016 | Fischer et al. |
| 2016/0172661 | A1 | 6/2016 | Fischer et al. |
| 2016/0197376 | A1 | 7/2016 | Koshiba et al. |
| 2016/0233549 | A1 | 8/2016 | Tiruvannamalai et al. |
| 2016/0261000 | A1 | 9/2016 | Zhang et al. |
| 2016/0344063 | A1* | 11/2016 | Chang .................. H01M 4/134 |
| 2017/0033406 | A1 | 2/2017 | Zhang et al. |
| 2017/0309960 | A1* | 10/2017 | Lim .................. H01M 10/0569 |
| 2018/0102531 | A1 | 4/2018 | Fischer et al. |
| 2018/0102532 | A1 | 4/2018 | Fischer et al. |
| 2018/0251681 | A1 | 9/2018 | Zhang et al. |
| 2018/0254524 | A1 | 9/2018 | Zhang et al. |
| 2019/0036179 | A1 | 1/2019 | Downie et al. |
| 2019/0036180 | A1 | 1/2019 | Downie et al. |
| 2019/0198933 | A1 | 6/2019 | Newhouse et al. |

FOREIGN PATENT DOCUMENTS

| | | |
|---|---|---|
| JP | 2008218387 A | 9/2008 |
| WO | 2015033619 | 12/2015 |

OTHER PUBLICATIONS

USPTO; Final Office Action dated Jul. 20, 2017 in U.S. Appl. No. 14/966,100.
USPTO; Notice of Allowance dated Oct. 19, 2017 in U.S. Appl. No. 14/966,100.
PCT; International Search Report and Written Opinion dated Nov. 26, 2018 in Application No. PCT/US2018/044429.
PCT; International Search Report dated Mar. 18, 2019 in Application No. PCT/US2018/066557.
PCT; Written Opinion dated Mar. 18, 2019 in Application No. PCT/US2018/066557.
Aurbach et al., "Prototype Systems for Rechargeable Magnesium Batteries," Nature, vol. 407(6805), pp. 724-727, (2000).
Aurbach et al., "Nonaqueous Magnesium Electrochemistry and its Application in Secondary Batteries," The Chemical Record, vol. 3, pp. 61-73, (2003).
Brandt, "Historical Development of Secondary Lithium Batteries," Solid State Ionics, vol. 69(3-4), pp. 173-183, (1994).
Chalasani et al., "Methylene Ethylene Carbonate: Novel Additive to Improve the High Temperature Performance of Lithium Ion Batteries," Journal of Power of Sources, vol. 208, pp. 67-73, (2012).
Dahn, "Electrically Rechargeable Metal-Air Batteries Compared to Advanced Lithium-Ion Batteries," presented at IBM Almadan Institute, (2009).
Harry et al., "Detection of Subsurface Structures Underneath Dendrites Formed on Cycled Lithium Metal Electrodes," Nature Materials, vol. 13, pp. 69-73, (2014).
Gallagher et al., "Manufacturing Costs of Batteries for Electric Vehicles," Lithium-Ion Batteries: Advances and Applications, Chapter 6, pp. 97-126, (2014).
Li et al., "A Review of Lithium Deposition in Lithium-Ion and Lithium Metal Secondary Batteries," Journal of Power of Sources, vol. 254, pp. 168-182, (2014).
Liu et al., "Rechargeable Mg-Ion Batteries Based on WSe2 Nanowire Cathodes," ACS Nano, vol. 7(9), pp. 8051-8058, (2013).
Matsui, "Study on Electrochemically Deposited Mg Metal," Journal of Power Sources, vol. 196(16), pp. 7048-7055, (2011).
Mikhaylik, "Protection of Li Anodes Using Dual Phase Electrolytes," Sion Power, DoE EERE Report, 8 Pages, (2011).
Nguyen et al., "Improved Cycling Performance of SI Nanoparticle Anodes via Incorporation of Methylene Ethylene Carbonate," Electrochemistry Communications, vol. 66, pp. 71-74.
Park et al., "A Highly Reversible Lithium Metal Anode," Nature Scientific Reports, vol. 4, Report No. 3815, 8 Pages, (2014).
Von Sacken et al., "Comparative Thermal Stability of Carbon Intercalation Anodes and Lithium Metal Anodes for Rechargeable Lithium Batteries," Journal of Power Sources, vol. 54(2), pp. 240-245, (1995).
Vaughey et al., "Lithium Metal Anodes," Annual Merit Review, DOE Vehicle Technologies Program, 31 Pages, (2009).
Zheng et al., "Magnesium Cobalt Silicate Materials for Reversible Magnesium Ion Storage," Electrochimica Acta, vol. 66, pp. 75-81, (2012).

* cited by examiner

ELECTROCHEMICAL CELL AND ELECTROLYTE FOR SAME

CROSS-REFERENCE TO RELATED APPLICATION

This application claims the benefit of U.S. Provisional Application No. 62/609,144, entitled "ELECTROCHEMICAL CELL AND ELECTROLYTE FOR SAME" and filed on Dec. 21, 2017, the disclosure of which is hereby incorporated herein for reference.

FIELD OF INVENTION

The disclosure generally relates to electrochemical cells and to electrolytes for use in electrochemical cells.

BACKGROUND OF THE DISCLOSURE

Electrochemical cells, such as rechargeable or secondary electrochemical cells, can be used to power a variety of devices, such as mobile phones, portable computers, power tools, other portable devices, electric or hybrid cars, autonomous or unmanned aerial, ground, or underwater vehicles (UAV's, UGV's, UUV's), as well as many other appliances. For many applications, it is desirous to use electrochemical cells with relatively high energy density (energy that can be derived from a cell per unit volume of the cell), relatively high specific energy density (energy that can be derived per unit weight of the cell or per unit weight of the active electrode material), and/or relatively high average discharge potential of the cell, so that desired energy can be supplied to a device using the cell, while minimizing the mass and/or volume that the cell adds to the device.

Generally, electrochemical cells include an anode, a cathode, a separator between the anode and cathode, and an electrolyte, such as non-aqueous electrolytes that include one or more non-aqueous solvents and one or more salts. During discharge of an electrochemical cell, an oxidation-reduction reaction occurs, causing electron flow through an external circuit, from the anode to the cathode, and causing attraction of cations from the anode to the cathode. In the case of secondary electrochemical cells, the cells can be recharged by causing electrons and cations to flow in the opposite direction using a charger.

For high-energy electrochemical cells (e.g., electrochemical cells with an average discharge potential of 3.5 Volts or more), such as those that rely, at least in part, on plating or electro-deposition and deplating or stripping or electro-dissolution reactions at the anode, electrolyte design and selection has been challenging. For example, ether-class solvents in lithium-metal electrochemical cells have exhibited relatively good cathodic stability against lithium metal (difficult to reduce at −3 V vs. a standard hydrogen electrode (SHE)), but such solvents generally suffer from low anodic stability (easily oxidized 0 to +0.5 V vs SHE). As a consequence, such solvents have not generally been used, because the charge voltage (and corresponding cell energy) of cells including such electrolytes is limited.

Recently, lithium salts, such as lithium fluorosulfonyl imde (LiFSI), lithium difluorooxalatoborate (LiDFOB), and the like have been developed to provide high electrochemical stability over a wide range of electrochemical cell voltages. High-molarity concentrations of these salts in solvents can coordinate a majority of solvent molecules, thus providing kinetically-stabilized solutions. These so-called "salt-in-solvent" solutions allow for electrochemical stability well past voltage limits otherwise inherent to the solvents, or similar electrolytes with relatively low molarity salt solutions.

In some cases, such as with LiFSI, the salt is so stable in an electrolyte that use of the salt can result in corrosion of cell components, such as a metal substrate onto which metal is plated and stripped. As a consequence, it has been reported that an additional co-salt can be utilized in a high molarity solution to inhibit such corrosion (e.g., $LiPF_6$ or LiDFOB addition to LiFSI). However, such electrolyte systems can suffer from their own disadvantages, including (i) high electrolyte cost due to the high salt content (e.g., 4-8 times an amount of salt per cell when compared to commercial $LiPF_6$ solutions, (ii) higher electrolyte mass overhead of a cell due to the high density of the electrolyte solutions, (iii) very high electrolyte viscosity, limiting an ability cell components to wet, or enabling use of only low loading, high porosity (low density) electrodes, (iv) poor transport properties of the electrolyte at useful rates, as exhibited by IR polarization, lower Coulombic efficiency, and low capacity utilization, when compared to commercial $LiPF_6$ solutions, and (v) phase transition of the electrolyte from liquid to solid state at relatively low temperature or as a consequence of solvent consumption during charge/discharge.

Cut solvents have been used to dilute electrolytes in an attempt to overcome some of these problems. However, use of cut solvents can reduce the voltage stability and Coulombic efficiency of the electrolyte. Various additives have also been tried in an attempt to address at least some of the above-mentioned disadvantages. Unfortunately, such attempts have not resulted in high-energy electrochemical cells with desired properties—e.g., high electrolyte mobility, high stability of the anode, and relatively low electrode corrosion.

Accordingly, improved electrolytes suitable for use in high-energy electrochemical cells and cells including such electrolytes are desired. In particular, electrolytes suitable for high voltage cells, such as those involving plating and deplating/stripping at an anode, that mitigate corrosion of cell components, while providing desirable transport and stability properties are desired.

Any discussion of problems provided in this section has been included in this disclosure solely for the purposes of providing a context for the present invention and should not be taken as an admission that any or all of the discussion was known at the time the invention was made.

SUMMARY OF THE DISCLOSURE

Various embodiments of the present disclosure provide improved electrochemical cells having desired properties and improved electrolytes for use in such electrochemical cells. Use of exemplary electrolytes described herein enable high efficiency, stable electrochemical cells that can be charged to relatively high voltages. As set forth in more detail below, exemplary electrolytes include various solvents and salts in amounts that surprisingly and unexpectedly enable such desirable properties in electrochemical cells including the electrolytes.

In accordance with exemplary embodiments of the disclosure, an electrolyte includes one or more first solvents, one or more second solvents, and one or more lithium salts, wherein an amount by volume of the first solvent in the electrolyte is less than or equal to an amount by volume of the second solvent. In accordance with various aspects of these embodiments, each of the one or more first solvents is selected from the group consisting of a low-coordinating solvent, a non-polar solvent, and a surfactant-type solvent. In the context of the present disclosure, low-coordinating solvent means that at least one, and in some cases, all of the one or more lithium salts have a solubility limit of 0.1, 0.005, or 0.001 molarity or less in the low-coordination solvent(s). By way of examples, the one or more first solvents can be or include a fluorine-substituted ether. In accordance with further aspects of these embodiments, each of the one or more second solvents is a coordinating (e.g., polar) solvent. Exemplary coordinating solvents include one or more of dimethoxyethane (DME), diethylene glycol dimethyl ether (diglyme), triethylene glycol dimethyl ether (triglyme), tetraethylene glycol dimethyl ether (tetraglyme), butyl diglyme, ethyl diglyme, ethylene carbonate (EC), ethyl methyl carbonate (EMC), dimethyl carbonate (DMC), propylene carbonate (PC), gamma-butyrolactone (GBL), ethyl acetate (EA), methyl difluoroacetate (MDFA), methyl butyrate (MB), tris8 2,2,2-trifluoroethy phosphite (TTFP), sulfolane (TMS), a carbonate ester, a acetate, a phosphite, a lactone, and a nitrile. In accordance with further exemplary aspects, the electrolyte includes greater than or equal to 5 moles (e.g., about 5 to about 10 moles) of at least one, and in some cases all of, the one or more lithium salts per liter of the one or more second solvents. The electrolyte can include, for example, about 3 to about 65 wt. %, about 30 to about 65 wt. %, or about 5 to about 45 wt. % of the first solvent; about 10 to about 45 wt. %, about 10 to about 50 wt. %, or about 20 to about 45 wt. %, or about 15 to about 33 wt. %, of the second solvent; and/or about 20 to about 45 wt. %, about 20 to about 40 wt. %, or about 35 to about 45 wt. % of the one or more lithium salts.

In accordance with further exemplary embodiments of the disclosure, an electrochemical cell, e.g., a lithium-metal electrochemical cell, includes a first electrode, a second electrode, a separator disposed between the first electrode and the second electrode, and an electrolyte, such as an electrolyte as described herein. The electrolyte can include one or more (e.g., a second) ionically conducting electrolytes in solid, polymer, gel, or liquid form. The first electrode can be a cathode or positive electrode during discharging of the electrochemical cell, and similarly, the second electrode can be an anode or negative electrode during discharging of the electrochemical cell. The second electrode can include, for example, lithium metal and optionally at least one other electrochemically active material. In accordance with various aspects of these embodiments, lithium metal can be or is reversibly electrochemically deposited onto the second electrode during charging of the lithium-metal electrochemical cell. In accordance with additional aspects, the first electrode comprises intercalation electrode material. In such cases, a lithium-metal electrochemical cell can charge to a voltage greater than to equal to 4.25 V, greater than to equal to 4.3 V, about 4.0 to about 5.5 V, about 4.25 to about 5.0 V, about 4.3 to about 5.0 V, about 4.0 to about 4.6 V, about 4.25 to about 4.6 V, or about 4.3 to about 4.6 V. In accordance with further examples, the first electrode comprises an electrode active material, which relies predominantly upon conversion or disproportionation mechanisms and can charge to ≥2.0 V about 2.0 V to about 4.7 V, or about 2.2 V to about 5.0 V. In accordance with further aspects, a ratio of capacity of the first electrode relative to the second electrode is greater than or equal to four, three, two, or one. In accordance with further aspects, the second electrode is configured to provide greater than 1000 mAh/cc. In accordance with yet further aspects, a pressure perpendicular to the interface of the first and second electrodes is greater than 0.06 MPa.

In accordance with yet further embodiments of the disclosure, a battery includes an electrolyte and/or an electrochemical cell as disclosed herein. The battery can additionally include a housing, one or more terminals, and optionally a gate electrode.

Both the foregoing summary and the following detailed description are exemplary and explanatory only and are not restrictive of the disclosure or the claimed invention.

BRIEF DESCRIPTION OF THE DRAWING FIGURES

A more complete understanding of the embodiments of the present disclosure may be derived by referring to the detailed description and claims when considered in connection with the following illustrative figures.

Figure 6:
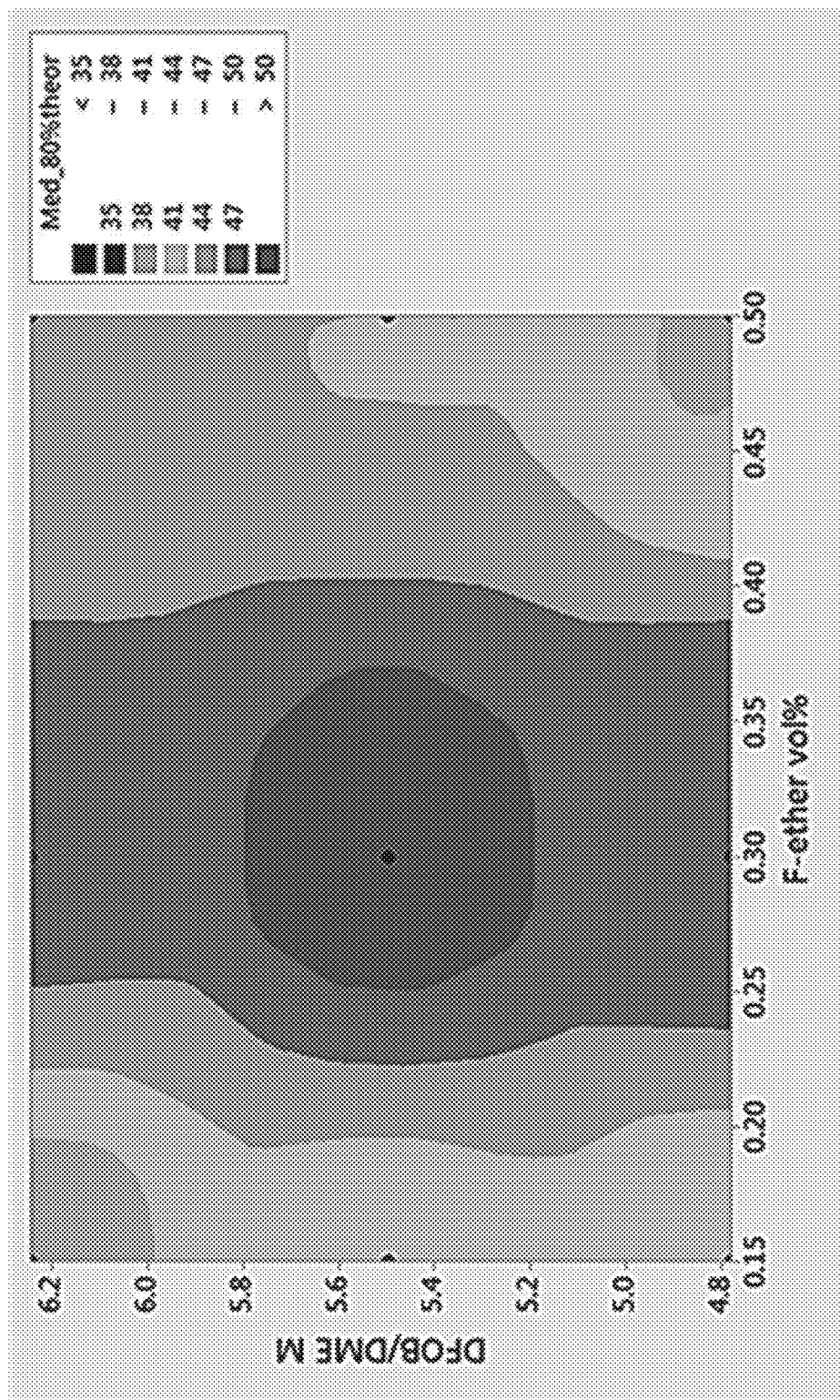

FIG. 6 illustrates a contour plot, showing average number of cycles to 80% capacity retention of about 250 mAh for a cell cycled between 3.0 and 4.4 V at a rate of C/4 charge and C/2 discharge at various electrolyte compositions.

Figure 7:
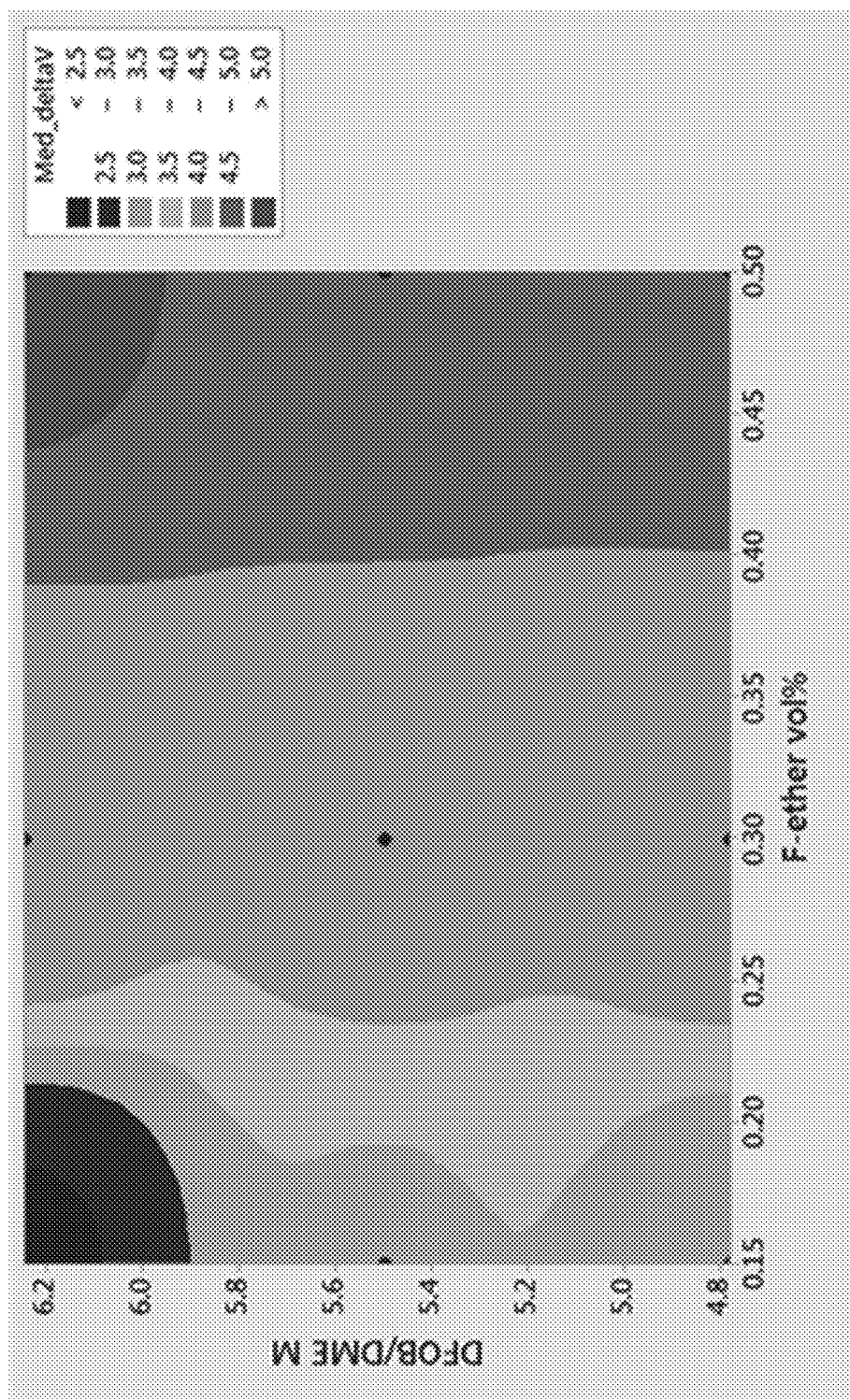

FIG. 7 illustrates a contour plot, showing volume change in ml for 250 mAh cells cycled between 3.0 and 4.4 V at a rate of C/4 charge and C/2 discharge for various electrolyte compositions.

Figure 8:
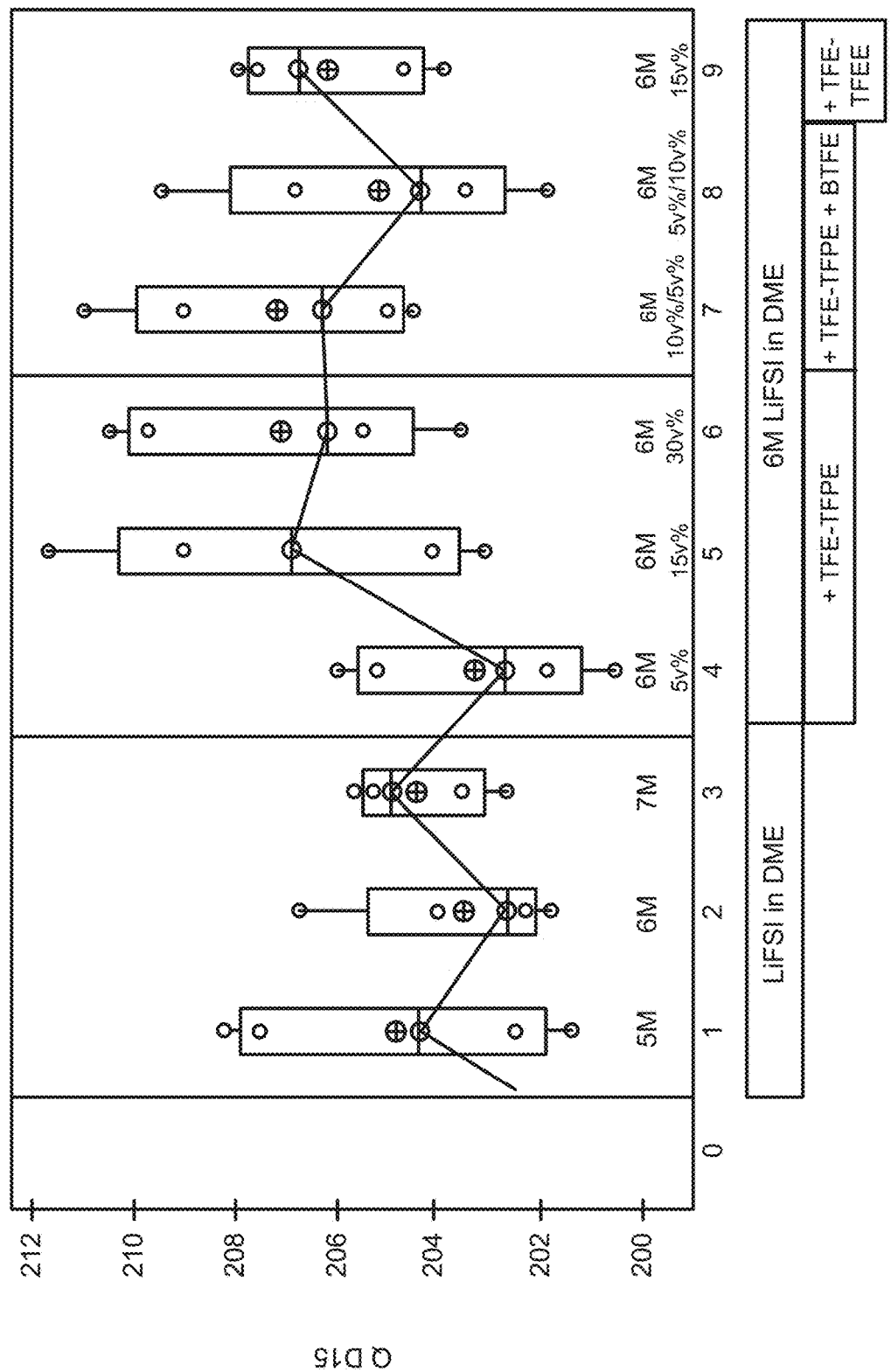

FIG. 8 illustrates a box plot, showing a capacity in mAh on the $15^{th}$ discharge cycle (Q D15) for 250 mAh cells in groups of 5 that are cycled between 3.0 and 4.35 V at a rate of C/2 charge and 1C discharge for various electrolyte compositions.

Figure 9:
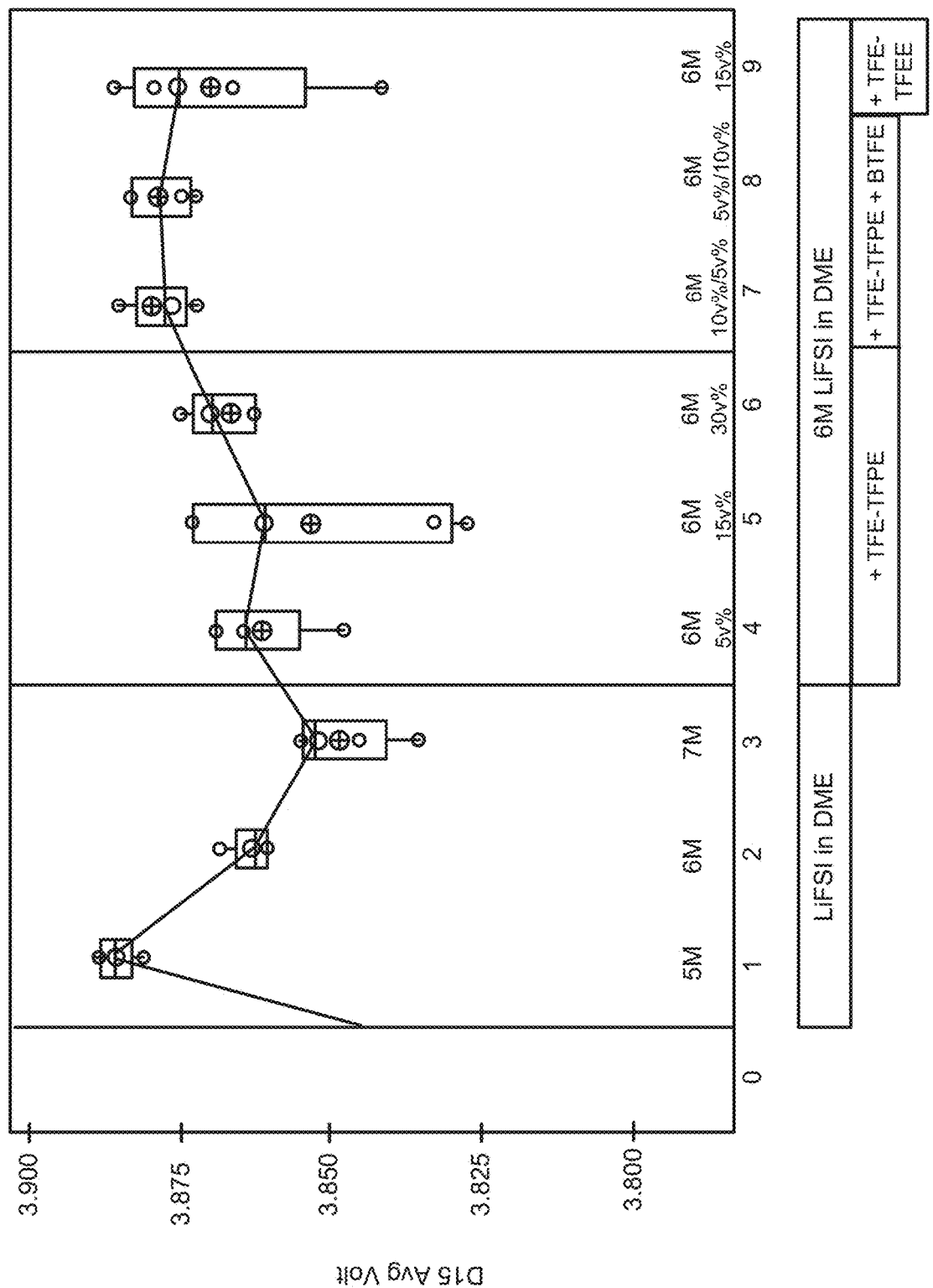

FIG. 9 illustrates a box plot, showing an average discharge voltage for the 15th cycle (D 15 Avg Volt) for 250 mAh cells in groups of 5 that are cycled between 3.0 and 4.35 V at a rate of C/2 charge and 1C discharge for various electrolyte compositions.

Figure 10:
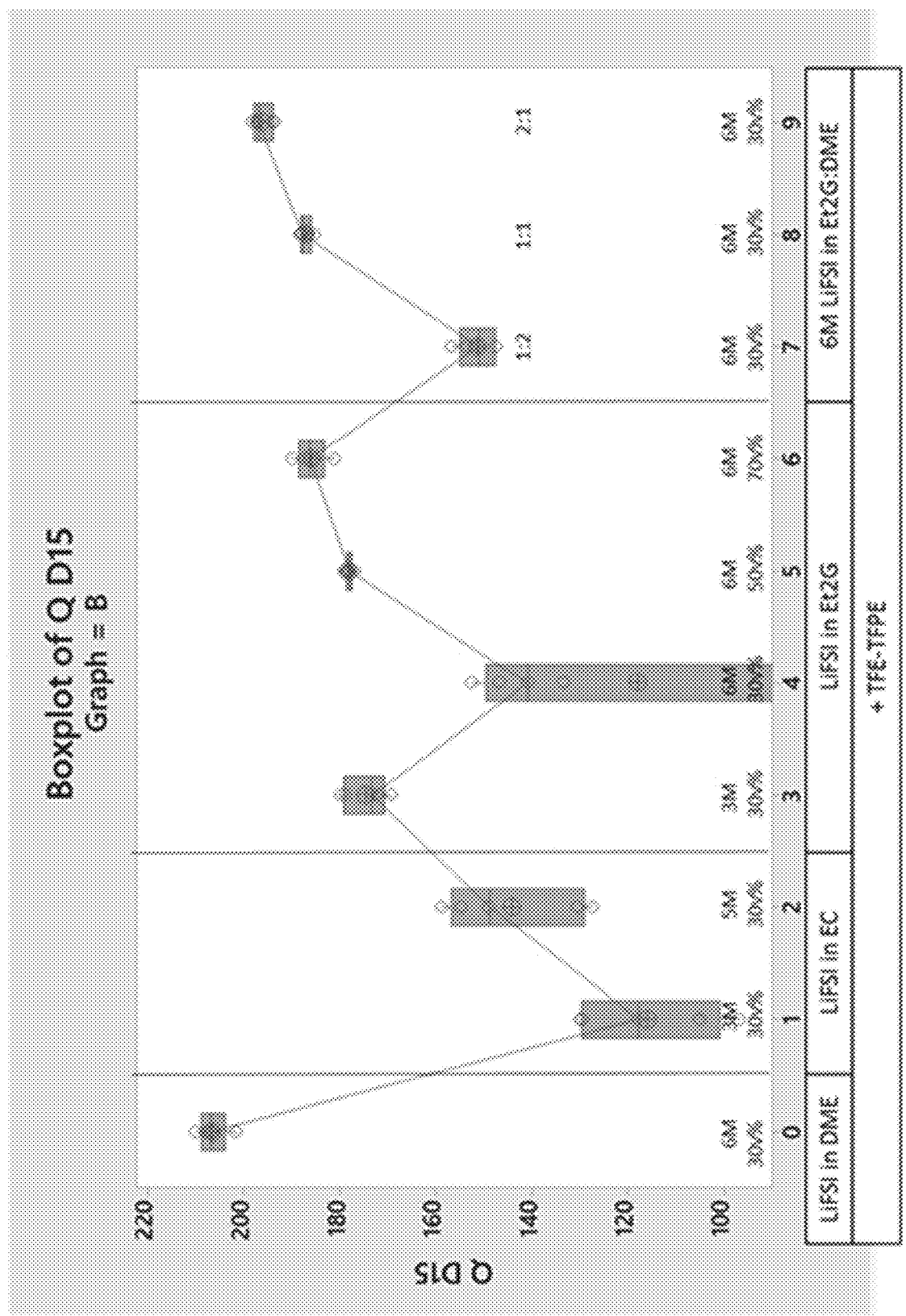

FIG. 10 illustrates a box plot demonstrating cycling performance of various second solvents (i.e., coordinating solvents), showing a capacity in mAh on the 15th discharge cycle (Q D15) for 250 mAh cells in groups of 5 that are cycled between 3.0 and 4.35 V at a rate of C/2 charge and 1C discharge for various electrolyte compositions as indicated on the x-axis.

Figure 11:
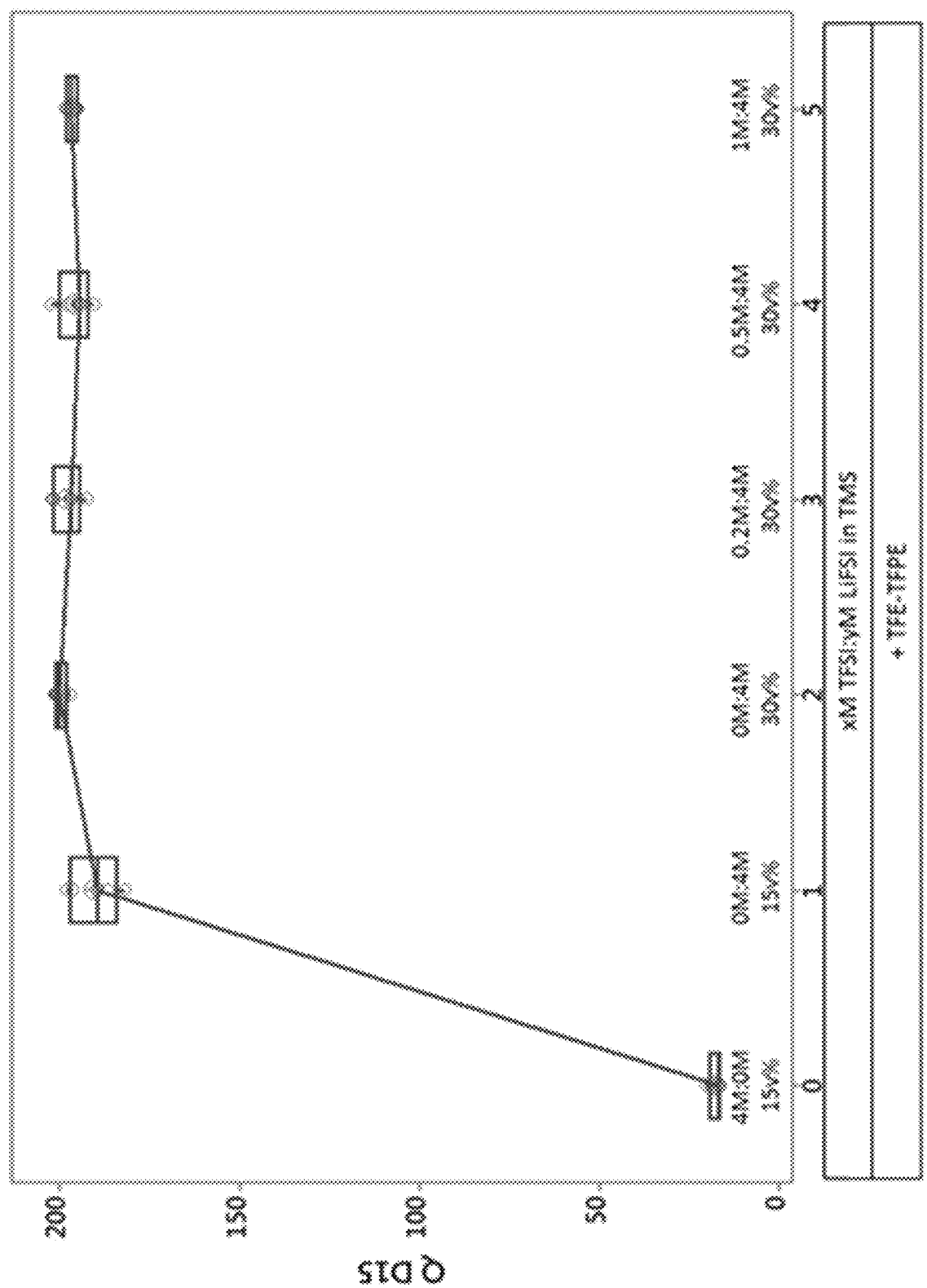

FIG. 11 illustrates a box plot depicting the use of combining multiple salts in high molarity second solvents such as sulfolane (TMS) when cut with first solvents (TFE-TFPE), showing a capacity in mAh on the 15th discharge cycle (Q D15) for 250 mAh cells in groups of 5 that are cycled between 3.0 and 4.35 V at a rate of C/2 charge and 1C discharge for various electrolyte compositions as indicated on the x-axis.

Figure 12:
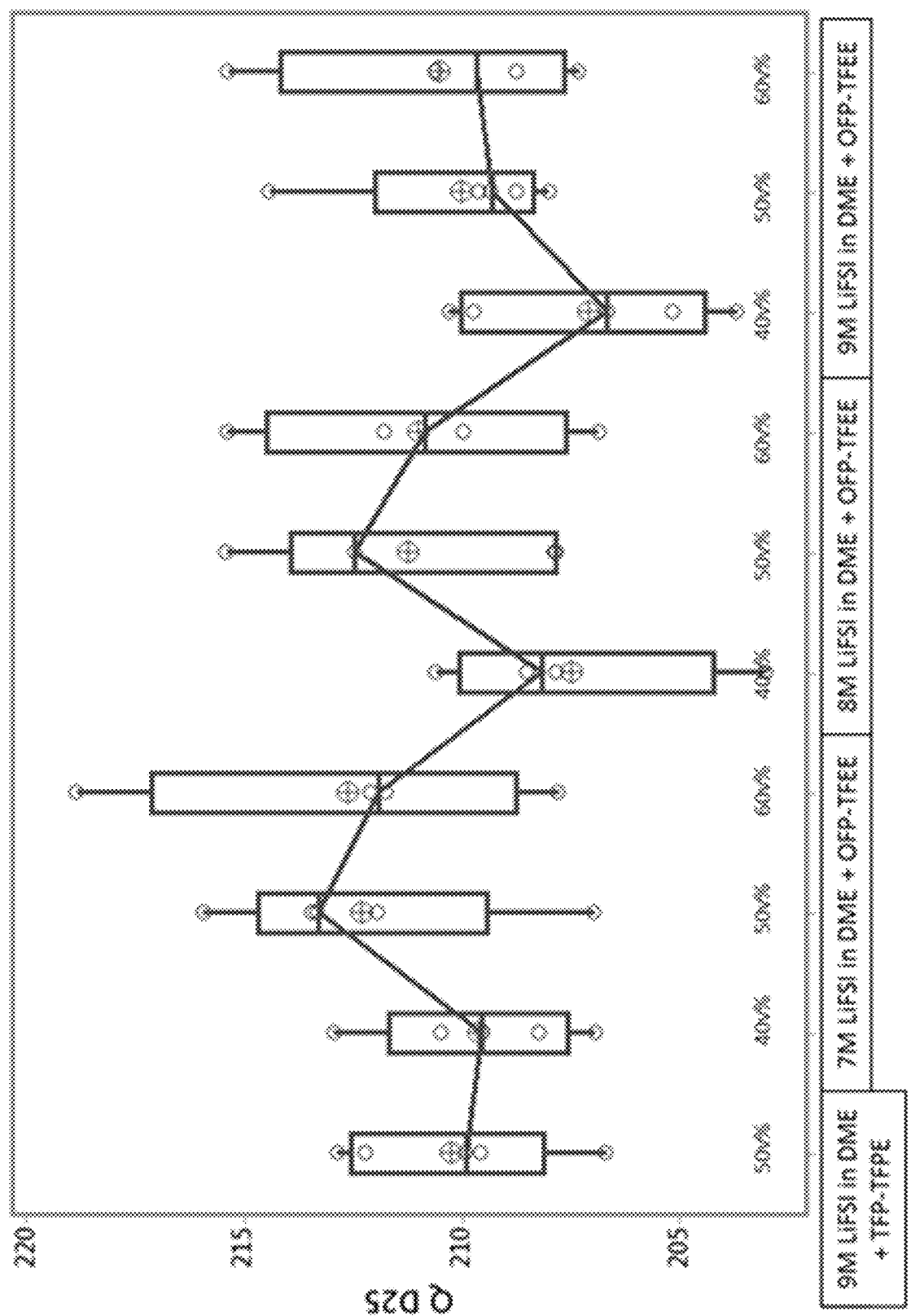

FIG. 12 illustrates a box plot depicting use of 1H,1H,5H-octafluoropentyl 1,1,2,2-tetrafluoroethyl ether (denoted "OFP-TFEE") in solutions disclosed herein, showing a capacity in mAh on the 25th discharge cycle (Q D25) for 250 mAh cells in groups of 5 that are cycled between 3.0 and 4.4

V at a rate of C/2 charge and 1C discharge for various electrolyte compositions as indicated on the x-axis.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS OF THE INVENTION

The description of exemplary embodiments of electrolytes, electrochemical cells, batteries, and methods provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features.

Any ranges indicated herein may include or exclude the endpoints. Any values of variables indicated (regardless of whether they are indicated with "about" or not) may refer to precise values or approximate values and include equivalents, and may refer to average, median, representative, majority, or a single value. Further, any electrolytes, electrochemical cells (sometimes referred to herein simply as cell or cells), batteries, or the like described herein can include (comprise), consist essentially of, or consist of recited components.

Definitions

Unless otherwise explicitly recited herein, any reference to "secondary" or "rechargeable" cell is understood to refer to an electrochemical cell capable of undergoing repeated charge and discharge.

Unless otherwise explicitly recited herein, any reference to "capacity" is understood to refer to an amount of energy charge in a battery that will allow a current to flow for a specified period (e.g., amp-hours) provided by the cell or device under normal operating conditions.

Unless otherwise explicitly recited herein, any reference to "non-aqueous fluid electrolyte" understood to refer to a non-aqueous liquid electrolyte or a non-aqueous gel electrolyte, and not to a molten salt electrolyte.

Unless otherwise explicitly recited herein, any reference to "current collector" understood to refer to any material capable of sufficiently conducting electrons.

Unless otherwise explicitly recited herein, any reference to a concertation of salt(s) in an electrolyte refers to the individual or sum of sum of moles of salt (e.g., lithium salt) when dissolved in the second/coordinating solvent.

Unless otherwise explicitly recited herein, any reference to "volume fraction" or "v %" is understood to refer to a fraction of one solvent volume to the entirety of solvent volume, excluding volume attributed to any salt(s).

Unless otherwise explicitly recited herein, any reference to "mass fraction" or "wt. %" is understood to refer to a fraction of one constituent's mass to the entirety of all constituents mass, including salt(s) and solvent(s) mass.

As noted above, design of electrolytes for high-energy electrochemical cells has been challenging. Some of the challenges can be illustrated in connection with a particular example of an electrolyte including lithium bis(fluorosulfonyl)imide (LiFSI) and dimethoxyethane (Glyme).

It is generally desired to have a high efficiency (e.g., Li) metal anode cell, so Glyme "G" is selected as an electrolyte solvent, because Glyme displays relatively high efficiency with Li metal, and LFSI is selected, because of LiFSI exhibits a wide window of stability (stability against reduction and oxidation). However, Glyme becomes unstable at typical ~1 M solution of LiFSI at higher electrochemical voltages (i.e., the electrolyte undergoes runaway oxidation during charging of the electrochemical cell above ~3.8-4.0 V at such LiFSI concentrations). Therefore a molarity of the LiFSI is increased to just below FSI:G ratio wherein crystalline species crash out (i.e., the electrolyte still liquid, but viscous and past the maximum conductivity). $LiPF_6$ can be added to inhibit corrosion of cell components due to LiFSI. However, the combination of these actions creates an inability of the electrolyte to wet the cell components, and/or cycle at useful rates or temperatures. These issues can be counteracted with a cut solvent, but this inherently causes the anodic instability and Coulombic inefficiency to reappear, because now uncoordinated "free" solvent molecules exist within the system.

The inventors have surprisingly and unexpectedly invented an electrolyte that can be used in, for example, high-energy electrochemical cells, while providing desired mobility and efficiency, while also mitigating instability and/or corrosion problems. Exemplary electrolytes, in accordance with the disclosure, includes one or more first solvents, one or more second solvents, and one or more lithium salts, wherein an amount by volume of the first solvent in the electrolyte is less than or equal to an amount by volume of the second solvent. Exemplary volume ratios include 0.9:1, 0.8:1, 0.7S:1, and 0.5:1 first solvent(s): second solvent(s). The inventors found that maintaining an amount by volume of the first solvent(s) in the electrolyte to less than or equal to the volume of the second solvent(s) in the electrolyte was important to obtain desired cell performance, such as high charge voltages, high Coulombic efficiency, and relatively low viscosity, to enable favorable charge transport within the electrolyte, while also allowing for desired stability and corrosion resistance of cell components and of cells including such electrolytes.

In accordance with various aspects of these embodiments, each of the one or more first solvents is selected from the group consisting of a low-coordinating solvent, a non-polar solvent, and a surfactant-type solvent. In the context of the present disclosure, low-coordinating solvent means that at least one, and in some cases, all of the one or more lithium salts have a solubility limit of 0.1, 0.005, or 0.001 molarity or less in the low-coordination solvent(s). Exemplary low-coordinating solvents can include one or more solvents selected from the group consisting of 1,1,2,2tetrafluoroethyl 2,2,3,3tetrafluoropropyl ether (TFE-TFPE), tetrafluoroethyl 1,1,2,2-tetrafluoroethyl ether (TFE-TFEE), ethyl 1,1,2,2-tetrafluoroethyl ether (ET-TFEE), ethyl 1,1,2,3,3,3-hexafluoropropyl ether, 1,1,2,2-tetrafluoroethyl 2,2,2-trifluoroethyl ether, bis(2,2,2-trifluoroethyl) ether (BTFE), 1H,1H,5H-octafluoropentyl 1,1,2,2-tetrafluoroethyl ether (OFP-TFEE), 1,1,1,2,3,3,6,6,7,7-decafluoro-4-oxaheptane, 1,1,2,3,3,3-hexafluoropropyl 2,2,2-trifluoroethyl ether, methoxytridecafluoroheptene and isomers thereof, heptafluoropropyl 1,2,2,2-tetrafluoroethyl ether, ethyl nonafluorobutyl ether, difluoromethyl 2,2,3,3-tetrafluoropropyl ether, 1,1,1,2,2,3,4,5,5,5-decafluoro-3 methoxy-4-(trifluoromethyl) pentane, pentafluoroanisole, 2,3,5,6-tetrafluoroanisole, trifluoromethoxy benzene, 1-fluoro-3-(trifluoromethoxy)benzene, 1,1,2,3,3,3-hexafluoropropyl methyl ether, 1,1,2,2,3,3-hexafluoro-1-(trifluoromethoxy)-3[(1,2,2- trifluorovinyl)oxy]propane, 1,1,2,2,3,3-hexafluoro-1,3-bis[(1,2,2-trifluorovinyl)oxy]propane, 1,3-Bis,1,1,2,2-tetrafluoroethoxy)propane, 1,2-(1,1,2,2-tetrafluoroethoxy)ethane, 1,1,1,2,3,3-hexafluoro-4-(1,1,2,3,3,3-hexafluoropropoxy-pentane, 2,3,3,4,4-pentafluorotetrahydro-5-methoxy-2,5-bis [1,2,2,2-tetrafluoro-1-(trifluoromethyl)ethyl]-furan, methyl nonafluorobutyl ether, methyl 2,2,3,3,3-pentafluoropropyl ether, methyl 1,1,2,2-tetrafluoroethyl ether, 1-fluoro-2-(trifluoromethoxy)benzene, 3-(trifluoromethoxy)benzonitrile, bis(4-fluorophenyl) ether, 1,1,1,2,2,3,4,5,5,5-decafluoro-3-methoxy-4-(trifluoromethyl)pentane, difluoromethoxy)benzene, 4-(difluoromethoxy)toluene, 2-fluorotoluene 3-flurotoluene, 4-fluorotoluene, trifluorotoluene, octafluorotoluene, fluorobenzene, difluorobenzene, pentafluorobenzene, hexafluorobenzene, perfluoro-2-methylpentane, perfluoromethylcyclohexane, fluorocyclohexane, perfluoroheptane, 1,2,3,4,5,6-hexafluorocyclohexane, and a cyclohexane. By way of examples, the one or more first solvents (e.g., low-coordinating solvent) can be or include a fluorine-substituted ether. Exemplary fluorine-substituted ethers can be represented by the general formula I and II.

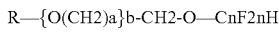

R—{O(CH2)a}b-CH2-O—CnF2nH  I, wherein R is —CmF2mH or —CmF2m+1, n is an integer of 2 or greater, m is an integer of 1 or greater, a is an integer of 1 or 2, and b is 0 or 1.

R—O—R'  II, wherein R and R' are separately represented by $C_aF_bH_c$, a is an integer of 2 or greater, b and c are integers >0 with b>c.

Exemplary non-polar solvents include toluene and F-toluene, where F-toluene, can be or include any fluorinated-toluene, such as 2, 3, or tri-F-toluene. It is understood that some solvents described herein can be considered a low-coordinating solvent, a non-polar solvent, and/or a surfactant-like or acting solvent.

In accordance with various embodiments of the disclosure, each of the one or more second solvents is a coordinating solvent. Exemplary coordinating solvents include ethers represented by the general formula III:

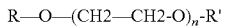

R—O—(CH2—CH2-O)$_n$-R'  III, wherein R and R' are hydrocarbon chains $C_mH_{2m+1}$ where m is an integer of 1 or greater, and n is an integer of 1 or greater.

By way of examples, the second solvent can include one or more of dimethoxyethane (DME), diethylene glycol dimethyl ether (diglyme), triethylene glycol dimethyl ether (triglyme), tetraethylene glycol dimethyl ether (tetraglyme), butyl diglyme, ethyl diglyme, ethylene carbonate (EC), ethyl methyl carbonate (EMC), dimethyl carbonate (DMC), propylene carbonate (PC), gamma-butyrolactone (GBL), ethyl acetate (EA), methyl difluoroacetate (MDFA), methyl butyrate (MB), tris[2,2,2-trifluoroethyl] phosphite (TTFP), sulfolane (TMS), a carbonate ester, a acetate, a phosphite, a lactone, and a nitrile.

The one or more lithium salts can include, for example, one or more salts that include at least three elements within the anion moiety and include two or more of the following: boron, phosphorous, fluorine, carbon, nitrogen, and oxygen. The one or more lithium salts can include lithium and one or more anions selected from the group consisting of bis(perfluoroalkylsulfonyl)imides, bis(perfluoroalkylsulfonyl) methides, bis(fluorosulfonyl)imide bis(trifluoromethanesulfonyl)imide, bis(perfluoroethylsulfonyl)imide, dicyanamide, tricyanomethide, tetracyanoborate, 2,2,2,-trifluoro-N-(trifluoromethylsulfonyl)acetamide, tetrafluoroborate, triflate, bis(oxalato)borate, difluoro(oxalato)borate, perchlorate, hexafluoroarsenate, hexafluoroantimonate, perfluorobutylsulfonate, tris(trifluoromethanesulfonyl)methide, trifluoroacetate, heptafluorobutanoate, thiocyanate, and triflinate.

Particular salts contemplated for use in the electrolytes of the invention can be described by the general formula LiA, where A is a polyatomic monovalent negative ion. Non-limiting examples of polyatomic monovalent anions, A, that are believed to be useful in practicing the invention include, but are not limited to, those described in Table I, and mixtures thereof.

| Chemical name | Acronym | Formula |
| --- | --- | --- |
| bis(perfluoroalkylsulfonyl)imides | | $N((C_xF_{2x+1})_xSO_2)_2^{-1}$ |
| bis(fluorosulfonyl)imide | FSI (x = 0) | $N(SO_2F)_2^{-1}$ |
| bis(trifluoromethanesulfonyl)imide | TFSI (x = 1) | $N(CF_3SO_2)_2^{-1}$ |
| bis(perfluoroethylsulfonyl)imide | BETI (x = 2) | $N(C_2F_5SO_2)_2^{-1}$ |
| Dicyanamide | DCA | $N(CN)_2^{-1}$ |
| tris(oxalato)phosphate | TOP | $P(C_2O_4)_3^{-1}$ |
| difluorophosphate | DFP | $PO_2F_2^{-1}$ |
| difluoro-bis(oxalato)phosphate | DFOP | $PF_2(C_2O_4)_2^{-1}$ |
| tetrafluoro(oxalate)phosphate | TFOP | $PF_4(C_2O_4)^{-1}$ |
| Tricyanomethide | TCM | $C(CN)_3^{-1}$ |
| tetracyanoborate | TCB | $B(CN)_4^{-1}$ |
| difluoro(malonato)borate | DFMB | $BF_2(C_3H_2O_4)^{-1}$ |
| bis(benzenesulfonyl)imide | BBI | $N(C_6H_5SO_2)_2^{-1}$ |
| triflate | OTf | $CF_3SO_3^{-1}$ |
| bis(oxalato)borate | BOB | $B(C_2O_4)_2^{-1}$ |
| difluoro(oxalato)borate | DFOB | $BF_2(C_2O_4)^{-1}$ |
| bis(perfluoropinacolato)borate | | $B(C_6F_{12}O_2)_2^{-1}$ |
| bis(salicylato)borate | BSB | $B(C_7H_4O_3)_2^{-1}$ |
| perfluorobutanesulfonate | PFBS | $(C_4F_9SO_3)^{-1}$ |
| thiocyanate | | $SCN^{-1}$ |
| triflinate | | $CF_3SO_2^{-1}$ |
| nitrate | | $NO_3^{-1}$ |

By way of examples, the one or more lithium salts can include one or more salts selected from the list including lithium bis(perfluoroalkylsulfonyl)imides, lithium bis(fluorosulfonyl)imide, lithium bis(trifluoromethanesulfonyl)imide, lithium bis(perfluoroethylsulfonyl)imide, lithium difluoro(oxalato)borate, lithium tris(oxalato)phosphate, difluorophosphate, lithium difluoro-bis(oxalato)phosphate and lithium tetrafluoro(oxalato)phosphate. Additionally or alternatively, the one or more lithium salts can include one or more of lithium hexafluorophosphate, lithium tetrafluoroborate, lithium hexafluoroarsenate, and lithium perchlorate in an amount less than 10 wt. % of the electrolyte and preferably down to zero wt. %. The electrolyte can include one or more salt additives, such as $LiAsF_6$, $LiNO_3$, LiI, LiSCN, $LiCF_3SO_3$, $LiN(CF_3SO_2)_2$, $LiC(SO_2CF_3)_3$, LiBOB, wherein a cumulative weight percent (i.e., wt. %) of the one or more lithium salt additives is <10 wt. % percent of the electrolyte. Various exemplary electrolytes can exclude certain lithium salts in >10% wt. % of cumulative solution; for example, any combination of $LiPF_6$, $LiBF_4$, $LiClO_4$ and/or other lithium salt(s) would be less than 10 wt. % of the electrolyte and preferably down to zero wt. %. Non-limiting examples of preferred embodiments disclosed herein in fact exclude constituents $LiPF_6$, $LiBF_4$, and $LiClO_4$ either alone, in combination with one another, and in combination with other lithium salt(s). While not being bound by any particular theory, exemplary embodiments of the invention disclose herein are surprisingly better optimized with the exclusion of $LiPF_6$, $LiBF_4$, and $LiClO_4$ either alone, in combination with one another, and in combination with other lithium salt(s). Consequently, exemplary lithium-metal electrochemical cells disclosed herein include one or more lithium salts, but excludes lithium hexafluorophosphate, lithium tetrafluoroborate, and lithium perchlorate.

In accordance with further exemplary aspects, the electrolyte includes greater than or equal to 5 moles (e.g., about 5 to about 10 moles) of at least one, and in some cases all of, the one or more lithium salts per liter of the one or more second solvents. By way of examples, the one or more lithium salts comprise at least two lithium salts, wherein the first lithium salt is selected from the group consisting of lithium bis(perfluoroalkylsulfonyl)imides, lithium bis(fluorosulfonyl)imide, lithium bis(trifluoromethanesulfonyl)imide, lithium bis(perfluoroethylsulfonyl)imide, lithium difluoro(oxalato)borate, lithium tris(oxalato)phosphate, lithium difluorophosphate, lithium difluoro-bis(oxalato)phosphate, lithium tetrafluoro(oxalato)phosphate, lithium triflate, lithium bis(perfluoroalkylsulfonyl)methides, lithium tris(trifluoromethanesulfonyl)methide, lithium perfluorobutylsulfonate, lithium difluoro(malonato)borate, lithium bis(benzenesulfonyl)imide, and lithium bis(perfluoropinacolato)borate and the second lithium salt (e.g., salt additive) is selected from the group consisting of lithium dicyanamide, lithium tricyanomethide, lithium tetracyanoborate, lithium 2,2,2,-trifluoro-N-(trifluoromethylsulfonyl)acetamide, lithium tetrafluoroborate, lithium bis(oxalato)borate, lithium perchlorate, lithium hexafluoroarsenate, lithium hexafluoroantimonate, lithium trifluoroacetate, lithium heptafluorobutanoate, lithium thiocyanate, and lithium triflinate. In these cases, the electrolyte can include between about 15 wt. % and 45 wt. % or about 20 wt. % to about 40 wt. % of the first lithium salt and between about 0.1 wt. % and about 10 wt. % or about 0.5 wt. % to about 10 wt. % of the second lithium salt.

The electrolyte as described herein, which includes the one or more first solvents and the one or more second solvents in the proportions, ratios, or weight percents (i.e., wt. %) set forth herein surprisingly alleviates design constraints, such as those noted herein. Without being bound to theory, it is thought that the salt: second (coordinating) solvent relation can maintain a high degree of binding, so as to maintain the higher than intrinsically available oxidative stability of the salt: coordinating solvent moiety, while allowing the salts to be solvated by the coordinating solvent.

Exemplary electrolytes include, for example, about 3 to about 65 wt. %, about 30 to about 65 wt. %, or about 5 to about 45 wt. %, of the first solvent; about 10 to about 45 wt. %, about 20 to about 50 wt. %, or about 15 to about 33 wt. %, of the second solvent; and/or about 20 to about 45 wt. %, about 15 to about 33 wt. %, or about 20 to about 40 wt. %, of the one or more lithium salts. These compositions can reduce the effective salt molarity going into the electrochemical cell (i.e., moves the concentration towards the amount of salt per cell when compared to typical high-capacity electrochemical cell solutions)—thus lowering the cost of cells compared to cells that include relatively high amounts of additives. Additionally, this can increase transport properties of the electrolyte, thereby enabling useful charge/discharge rates, less IR polarization, higher Coulombic efficiency, and/or high capacity utilization when compared to typical high-capacity electrochemical cell solutions.

An electrolyte in accordance with the present disclosure can include additional materials, such as a second ionically conducting electrolyte in solid, polymer, gel, fluid, or liquid form. The electrolyte can exhibit a boiling Point of <130° C. for more than 25% volume fraction of solvents in the electrolyte. Further, the electrolyte can include <750 ppm $H_2O$.

Electrochemical Cells

Figure 1:
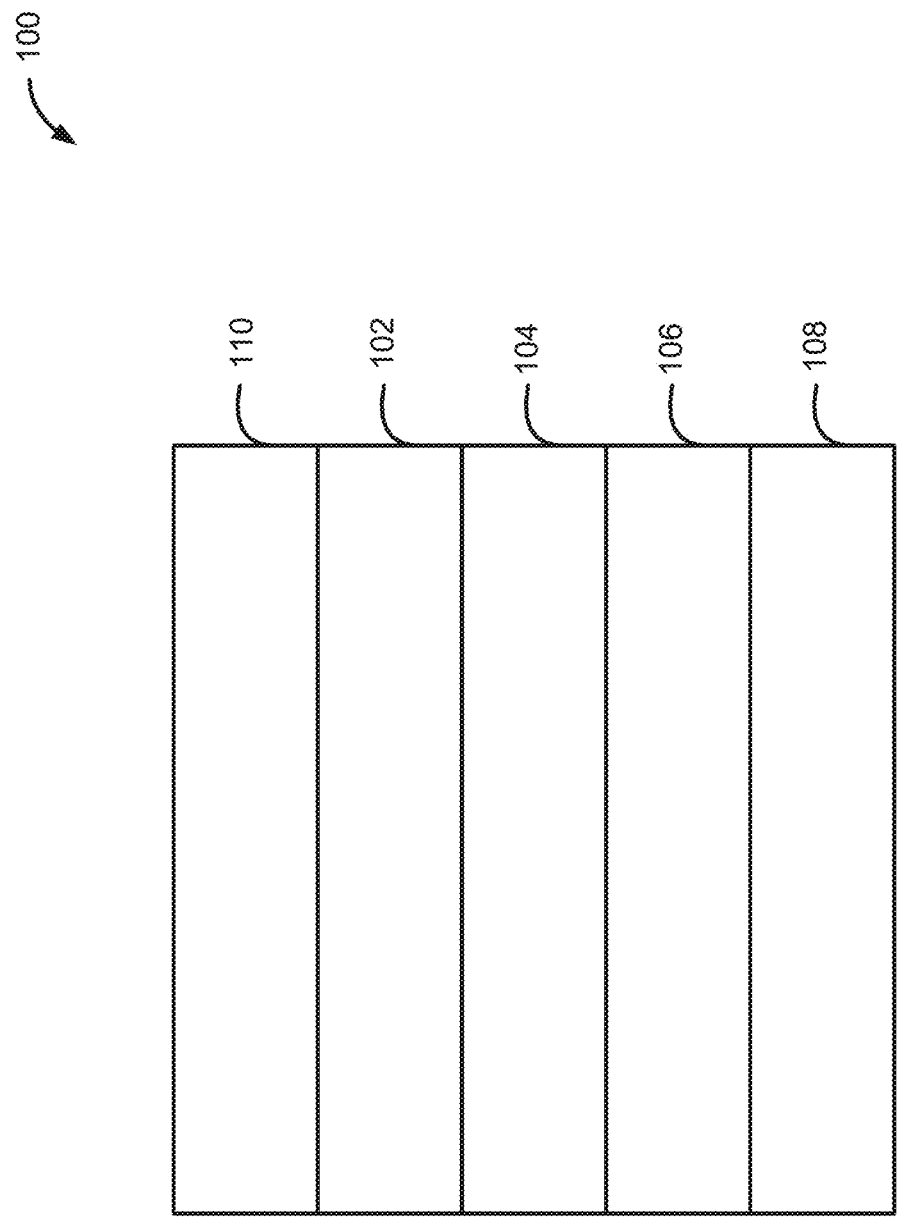
FIG. 1 illustrates an electrochemical cell in accordance with at least one exemplary embodiment of the disclosure.

Turning now to the figures, FIG. 1 illustrates an electrochemical cell 100 in accordance with exemplary embodiments of the disclosure. Electrochemical cell 100 includes a first electrode 102, a second electrode 106, a separator 104 interposed between first electrode 102 and second electrode 106, and an electrolyte (not illustrated) in fluid contact with first and second electrodes 102, 106. In the illustrated example, electrochemical cell 100 also includes a first current collector 110 in electrical contact with first electrode 102 and a second current collector 108 in contact with the second electrode 106.

First electrode 102 (also sometimes referred to herein as a positive electrode or cathode) can include intercalation material. Exemplary intercalation materials include transition metal oxides, transition metal oxo-anions, chalcogenides, halogenides and combinations thereof. Non-limiting examples of positive electrode active materials for the lithium electrochemical cells include lithium transition metal oxides comprised of one or more transition metals and one or more redox active transition metals such lithium cobalt oxide, lithium nickel manganese cobalt oxide, lithium nickel cobalt aluminum oxide, lithium iron phosphate, lithium manganese oxide, lithium nickel manganese oxide, a lithium metal oxide. First electrode 102 can initially include most or all of the active material for second electrode 106.

In accordance with various examples, first electrode 102 comprises intercalation electrode material. In such cases, a lithium-metal electrochemical cell can charge to a voltage greater than to equal to 4.25 V, greater than to equal to 4.3 V, about 4.0 to about 5.5 V, 4.25 to about 5.0 V, about 4.3 to about 5.0 V, about 4.0 to about 4.6 V, about 4.25 to about 4.6 V, or about 4.3 to about 4.6 V. In accordance with further examples, the first electrode 102 comprises an electrode active material, which relies predominantly upon conversion or disproportionation mechanisms and can charge to ≥2.0 V, about 2.0 V to about 4.7 V, or about 2.2 V to about 5.0 V. In accordance with further aspects, a ratio of capacity of the first electrode relative to the second electrode is greater than or equal to four, three, two, or one.

Second electrode 106 (also sometimes referred to herein as a negative electrode or anode) includes a negative electrode active material that can accept cations. Non-limiting examples of negative electrode active material include lithium, lithium alloys such as Si, Sn, Bi, and/or Al alloys, $Li_4Ti_5O_{12}$, hard carbon, graphitic carbon, and/or amorphous carbon. In accordance with some embodiments of the disclosure, most (e.g., greater than 90 wt. % to all) of the anode active material can be initially included in a discharged first electrode 102 when electrochemical cell 100 is initially made, so that the electrode active material forms part of second electrode 106 during a first charge of electrochemical cell 100. A technique for depositing electroactive material on a portion of second electrode 106 or second current collector 108 using this technique is described in U.S. Patent Publication No. 2016/0172661, in the name of Fischer et al., the contents of which are hereby incorporated herein by reference, to the extent such contents do not conflict with the present disclosure. In accordance with various examples of the disclosure, electrode 106 plates/strips lithium metal, at least in part, during charging and discharging of the cell.

First electrode 102 or second electrode 106 can further include one or more electronically conductive additives. Non-limiting examples of electronically conductive additives include carbon black, Super P®, C-NERGY™ Super C65, Ensaco® black, Ketjeriblack®, acetylene black, synthetic graphite such as Timrex® SFG-6, Timrex® SFG-13, Timrex® SFG-44, Timrex® KS-6, Timrex® KS-15, Timrex® KS-44, natural flake graphite, carbon nanotubes, fullerenes, hard carbon, or mesocarbon microbeads. First electrode 102 or second electrode 106 can include any combination of the one or more electronically conductive additives.

In accordance with some embodiments of the disclosure, first electrode 102 or second electrode 106 further includes one or more polymer binders. Non-limiting examples of polymer binders include poly-vinylidene fluoride (PVdF), poly(vinylidene fluoride-co-hexafluoropropene) (PVdF-HFP), Polytetra flu oro ethylene (PTFE), Kynar Flex® 2801, Kynar® Powerflex LBG, and Kynar® HSV 900, and Teflon®. First electrode 102 or second electrode 106 can include any combination of the one or more polymer binders.

In accordance with further embodiments, second electrode 106 includes lithium metal and at least one other electrochemically active material. The at least one other electrochemically active material can include or be a metal, an alloy, an intermetallic compound, and an intercalation compound, or a combination thereof.

In accordance with further exemplary embodiments, second electrode 106 is configured to provide >1000 mAh/cc. Exemplary techniques for forming such electrodes are described in U.S. Patent Publication No. 2016/0172661.

In accordance with yet further exemplary embodiments of the disclosure, at least one of the first electrode 102 and the second electrode 106 include a metal, an alloy, or an intermetallic compound. In accordance with additional or alternative exemplary embodiments, at least one of the first electrode 102 and the second electrode 106 include a material configured to undergo an insertion reaction, an alloying, an intercalation, a disproportionation, a conversion reaction, or any combination thereof.

Separator 104 electrically isolates the first electrode from the second electrode and is permeable to at least one mobile species which is redox-active at least one of the first electrode and the second electrode. Exemplary materials suitable for separator 104 in accordance with embodiments of the disclosure include virgin or ceramic coated porous polypropylene, porous polyethylene, and glass fiber. In addition, the separator may include, at least in part, solid or polymer ionic conducting materials.

The electrolyte of electrochemical cell 100 can be or include any of the electrolytes described herein.

First current collector 108 and/or second current collector 110 can include any material capable of sufficiently conducting electrons. Non-limiting examples of such materials include aluminum, copper, nickel, and alloys thereof. Exemplary first/second electrode current collector 108/110 materials include carbonaceous materials and a metal substrate coated with an over-layer to prevent or mitigate corrosion in the electrolyte.

In accordance various examples of electrochemical cells described herein, a pressure perpendicular to the interface of the first and second electrodes is greater than 0.06 MPa. Additionally or alternatively, a lithium-metal electrochemical cell as described herein can be configured to charge and discharge with >99.35% Coulombic efficiency.

Batteries

A battery can include one or more electrochemical cells (in parallel or in series), such as electrochemical cell 100. The battery can be a button or coin cell battery comprising discs of electrochemical cell components (electrode and separator) that sit in a can base onto which a can lid is crimped. In other embodiments, the battery is a stacked cell battery. In other embodiments, the battery is a prismatic or pouch cell comprising one or more stacked electrochemical cells sandwiched between current collectors.

Figure 2:
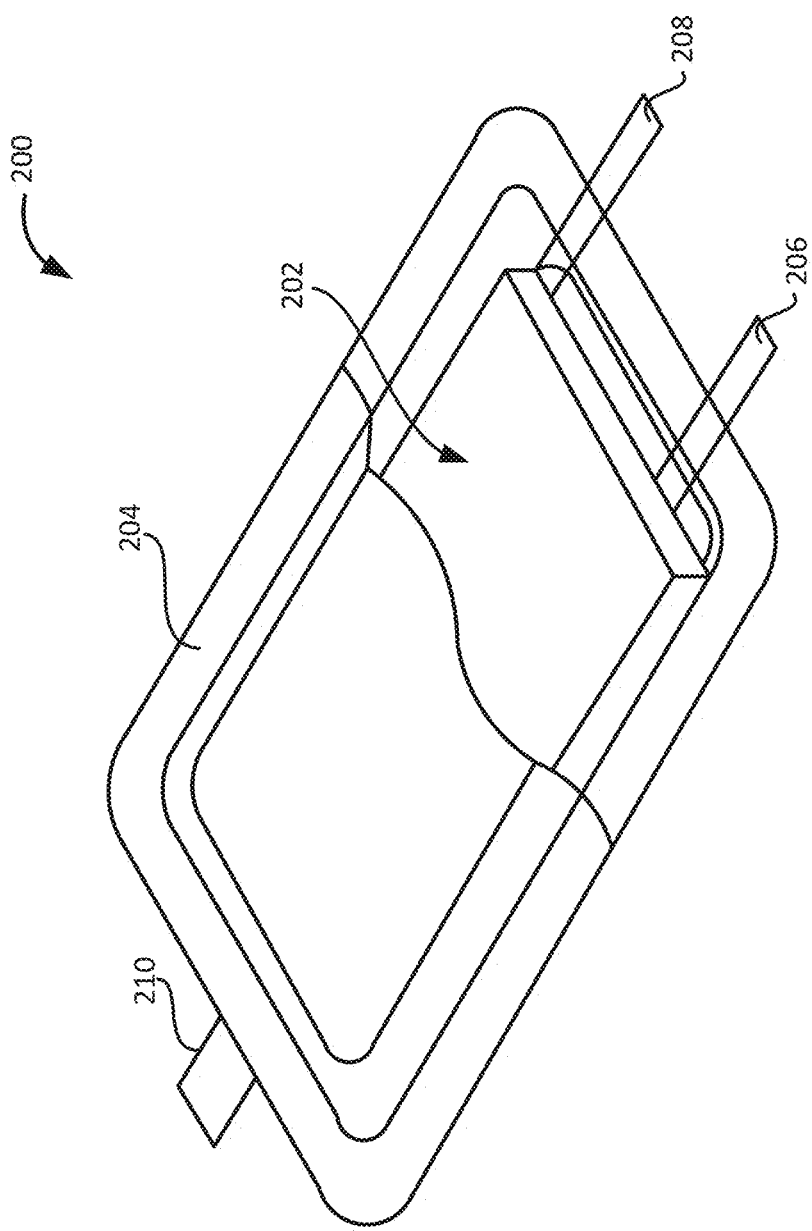
FIG. 2 illustrates a battery in accordance with at least one exemplary embodiment of the disclosure.

FIG. 2 illustrates an exemplary soft pack cell laminate battery 200 that includes an electrochemical cell 202, which can be the same or similar to electrochemical cell 100 and first and second tabs 206 and 208. First tab 206 can form contact to a first electrode (e.g., first electrode 102), second tab 208 can form contact to a second electrode (e.g., second electrode 106). Battery 200 can optionally include one or more third tabs 210 that are electrically coupled to a gate electrode, if present. Electrochemical cell 202 can include a folded electrochemical cell (e.g., cell 100), which can be within a (e.g., polymer coated aluminum foil) pouch 204. Pouch 204 can be vacuum and heat dried, filled with electrolyte (e.g., an electrolyte as described herein), and vacuum and heat sealed. In other embodiments, the battery is a prismatic or pouch bi-cell comprising one or more stacks of a positive electrode that is coated with active material on both sides and wrapped in porous separator, and a negative electrode folded around the positive electrode, wherein one or both current collectors can comprise carbonaceous materials. These electrochemical cells can be folded within a (e.g., polymer coated aluminum foil) pouch, dried under heat and/or vacuum, filled with electrolyte, and vacuum and heat sealed. In accordance with some embodiments, the prismatic or pouch cells include an additional tab composed of a metal foil or carbonaceous material of the same kind as current collectors described herein. Tab 206, 208 and/or additional tab 210 can be affixed to the current collector by laser or ultrasonic welding, adhesive, or mechanical contact, in order to connect the electrodes to the device outside the packaging.

In accordance with yet additional embodiments, the battery is a wound or cylindrical cell comprising one or more electrochemical cells as described herein. In this case, the battery can include wound layers of one or more stacks of a positive electrode which is coated with active material on one or both sides, sandwiched between layers of porous separator, and a negative electrode, wherein one or both current collectors comprise carbonaceous materials. The stack(s) can be wound into cylindrical roll, inserted into the can, dried under heat and/or vacuum, filled with electrolyte, and vacuum and welded shut. In some embodiments of the cylindrical cells described herein, an additional tab composed of a metal foil or conducting material of the same kind as current collectors described herein, is affixed to the current collector by laser or ultrasonic welding, adhesive, or mechanical contact, in order to connect the electrodes to an external circuit outside the packaging.

EXAMPLES

The following non-limiting examples illustrate electrolyte compositions in accordance with exemplary embodiments of the disclosure. These examples are merely illustrative, and it is not intended that the invention be limited to the examples.

Figure 3:
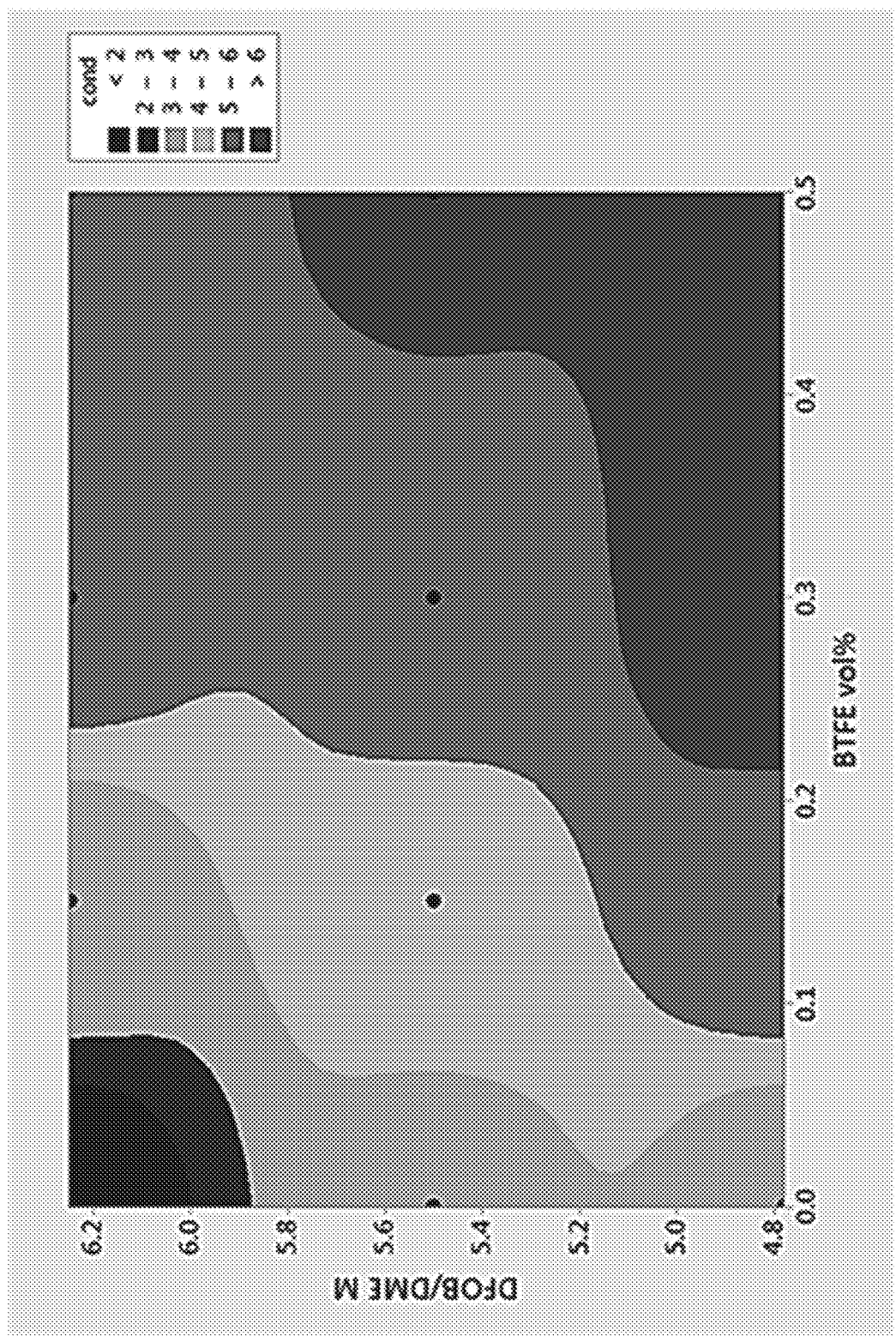
FIG. 3 illustrates a contour plot, showing conductivity (mS/cm at room temp) for various electrolyte compositions.

FIG. 3 illustrates a contour plot that shows the conductivity (mS/cm at room temp) for electrolyte solutions ranging between 4.8 and 6.25 M LiDFOB in DME (second solvent) across a range of zero to 50% volume BTFE (first solvent) of total solvent (i.e., BTFE+DME). High lithium salt concentrations and little to no volume fraction of first solvent is represented in the upper left-hand corner of the plot, and display very low (i.e., <3 mS/cm) conductivity. In contrast, the conductivity increases significantly at low (5-40%) volume fraction first solvent, allowing one to maintain high conductivity and high salt concentration (>5.0 M) in simultaneous fashion. In particular, electrolyte solutions comprising concentrations >5M salt in second solvent and at least 30-50% volume fraction first solvent are show exemplary.

Figure 4:
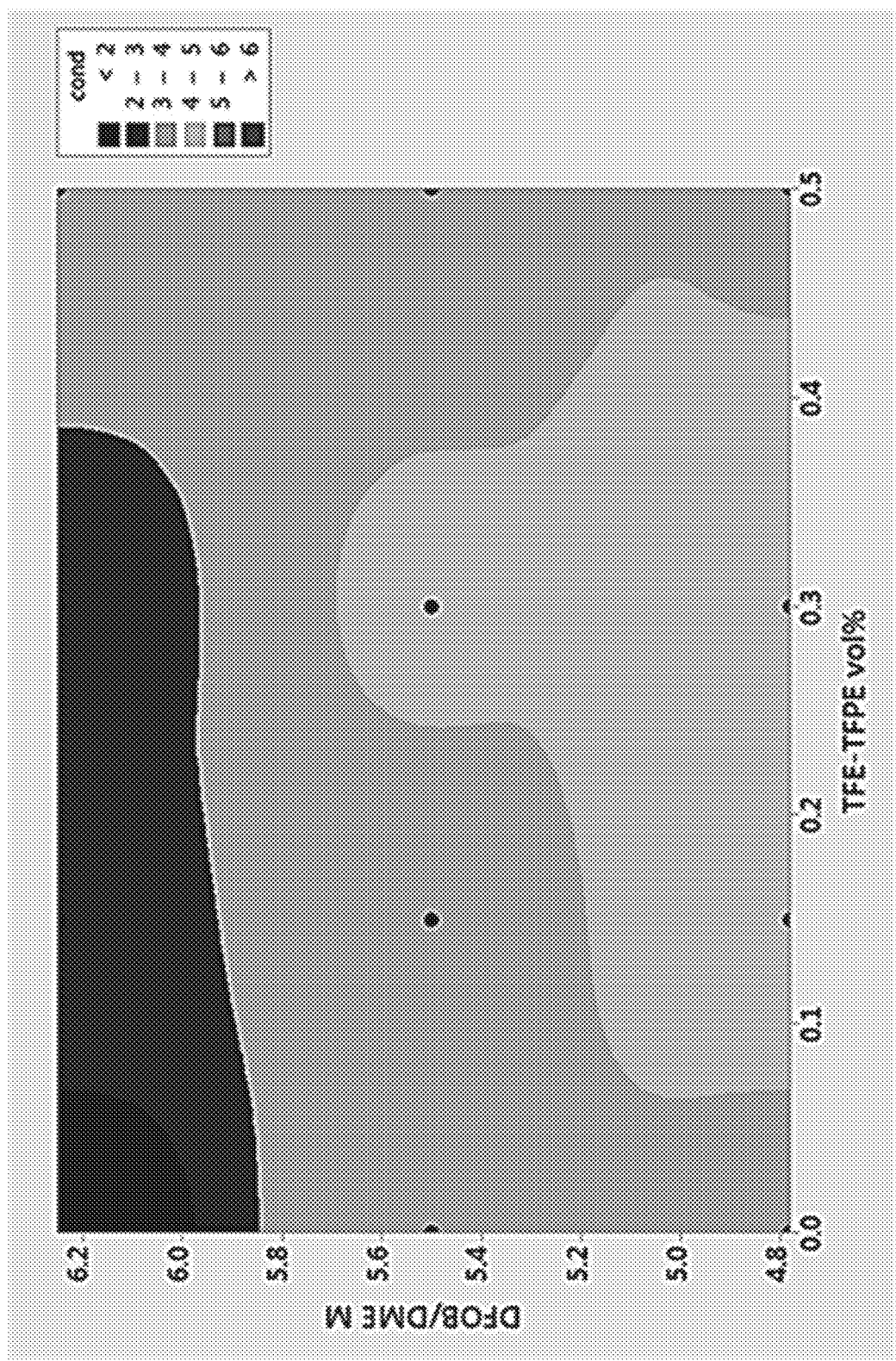
FIG. 4 illustrates a contour plot, showing conductivity (mS/cm at room temp) for various electrolyte compositions.

FIG. 4 illustrates contour plot that shows the conductivity (mS/cm at room temp) for electrolyte solutions ranging between 4.8 and 6.25 M LiDFOB in DME, (second solvent) across a range of zero to 50% volume TFE-TFPE (first solvent) of total solvent (i.e., TFE-TFPE+DME). High lithium salt concentrations and little to no volume fraction of first solvent is represented in the upper left-hand corner of the plot, and display very low (i.e., <3 mS/cm) conductivity. In contrast, the conductivity increases significantly at low (5-40%) volume fraction first solvent, allowing one to maintain high conductivity and high salt concentration (>5.0 M) in simultaneous fashion. It is also notable that the conductivity decreases at high (≥45%) volume fraction first solvent herein regardless of molarity.

Figure 5:
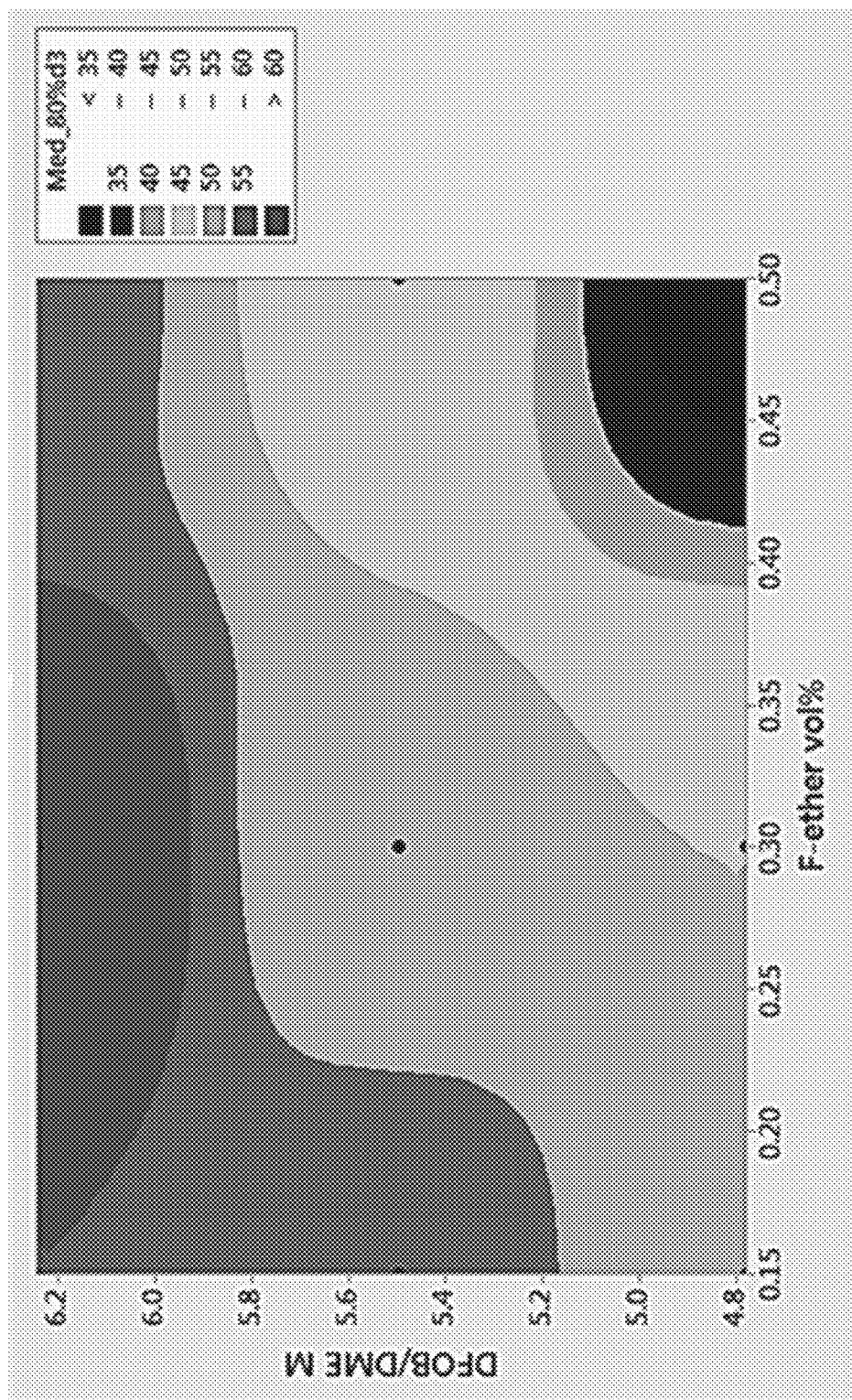
FIG. 5 illustrates a contour plot, showing number of cycles to 80% capacity retention of the third cycle discharge capacity for a 250 mAh cell cycled between 3.0 and 4.4 V at a rate of C/4 charge and C/2 discharge for various electrolyte compositions.

FIG. 5 illustrates contour plot that shows the number of cycles to 80% capacity retention of the third cycle discharge capacity for a 250 mAh cell cycled between 3.0 and 4.4 V at a rate of C/4 charge and C/2 discharge for solutions ranging between 4.8 and 6.25 M LiDFOB in DME across a range of zero to 50% volume BTFE of total solvent (i.e., BTFE+DME). The lowest degree of capacity fade is displayed for solutions wherein the lithium salt molarity is about 5.5 to 6.5 M LiDFOB in DME and the first solvent volume fraction is >25-50% BTFE. The highest degree of capacity fade is displayed in the bottom, right corner of the plot wherein the lithium salt molarity is about 5 M LiDFOB in DME and the first solvent volume fraction is >4.5% BTFE.

FIG. 6 illustrates contour plot that shows the average number of cycles to 80% capacity retention of about 250 mAh for a cell cycled between 3.0 and 4.4 V at a rate of C/4 charge and C/2 discharge for solutions ranging between 4.8 and 6.25 M LiDFOB in DME across a range of zero to 50% volume TFE-TFPE of total solvent (i.e., TFE-TFPE+DME). The lowest degree of capacity fade is displayed for solutions wherein the lithium salt molarity is about 5 to 7 M LiDFOB in DME and the first solvent volume fraction is >20-40% TFE-TFPE. The highest degree of capacity fade is displayed in the bottom, right corner of the plot wherein the lithium salt molarity is about 5 M LiDFOB in DME and the first solvent volume fraction is >45% BTFE as well as the upper left hand corner wherein the lithium salt molarity is about 6-6.5 M LiDFOB in DME and the first solvent volume fraction is <20% TFE-TFPE.

FIG. 7 illustrates contour plot that shows the volume change in ml for 250 mAh cells cycled between 3.0 and 4.4 V at a rate of C/4 charge and C/2 discharge for solutions ranging between 4.8 and 6.25 M LiDFOB in DME across a range of zero to 50% volume TFE-TFPE, of total solvent (i.e., TFE-TFPE+DME). That is, the volume change of the cell in ml represents the increase in solid mass and gas accumulated in the cell during cycling under these conditions due to inefficient reaction(s). At 15-20% volume fraction TFE-TFPE the increase in volume is small and decreases as lithium salt molarity increases from 5 to 6 and 6 to 7 M LiDFOB. At >20% volume fraction TFE-TFPE the change in volume is less affected by a change lithium salt molarity of interest herein, but it is clearly increasing as the volume fraction of first solvent increases. That is, the delta volume increases when increasing TFE-TFPE volume fraction 20-25% to 25-40%, and then another marked increase at >40% TFE-TFPE.

FIG. 8 illustrates the capacity in mAh on the 15th discharge cycle (Q D15) for 250 mAh cells in groups of 5 that are cycled between 3.0 and 4.35 V at a rate of C/2 charge and 1C discharge for various solutions ranging between 5-7 M LiFSI in DME across a range of zero to 30% volume NS wherein first solvent=TFE-TFPE, or combination of TFE-TFPE+BTFE, or TFE-TFPE by itself.

FIG. 9 illustrates the average discharge voltage for the 15th cycle (D15 Avg Volt) for 250 mAh cells in groups of 5 that are cycled between 3.0 and 4.35 V at a rate of C/2 charge and 1C discharge for various solutions ranging between 5-7 M LiFSI in DME across a range of zero to 30% volume first solvent wherein the first solvent=TFE-TFPE, or combination of TFE-TFPE+BTFE, or TFE-TFPE by itself.

As the concentration of LiFSI increases from 5 M to 7 M in DME only (Groups 1 to 3, respectively, in FIG. 8 and FIG. 9) the capacity shows little to no change, while the average discharge voltage decreases in monotonic fashion, thus corresponding to an overall energy decrease in this given cell. This is thought to be due to increasing viscosity, thus meaning one has to trade energy and power to achieve electrochemical stability at both the high voltage of the cathode and low voltage of the lithium anode. In contrast, cells comprising an electrolyte of 5-7 M LiFSI in DME and also 5-50 % first solvent, such as fluorinated ether like TFE-TFPE, do not make such sacrifice. For example comparison of 6 M LiFSI in DME (Group 2 in FIG. 8 and FIG. 9) to the same solution, but with 5 % volume TFE-TFPE (Group 4 in FIG. 8 and FIG. 9), with 15% volume TFE-TFPE (Group 5 in FIG. 8 and FIG. 9), or with 30% volume TFE-TFPE (Group 6 in FIG. 8 and FIG. 9) show a trend of increasing capacity and increasing average discharge voltage at the $15^{th}$ discharge cycle as the volume fraction TFE-TFPE increases from zero to five to fifteen and then to thirty percent. Therefore, it is surprisingly possible to achieve markedly higher energy and power while maintaining electrochemical stability at both the high voltage of the cathode and low voltage of the lithium anode. In addition, it is possible to achieve such performance with a variety of first solvents, such as other fluorinated ethers or other first solvents and combinations of two or more first and/or second solvents, such as those describes herein.

FIG. 10 illustrates cycling performance of various second solvents (i.e., coordinating solvents) relative to dimethoxyethane (DME) by showing the capacity in mAh on the $15^{th}$ discharge cycle (Q D15) for 250 mAh cells that are cycled between 3.0 and 4.35 V at a rate of C/2 charge and 1C discharge. The other various electrolyte compositions are indicated on the x-axis and show that comparable capacity is obtained when, for example, DME is replaced by ethyl diglyme (Et2G) in entirety (i.e., sample #4 vs. #0 Et2G replaces DME entirely) or in part (i.e., samples #7, #8, #9 increase ratio of Et2G to DME at fixed composition). In addition, these examples shows a preferred solution wherein an amount by volume of the first solvent in the electrolyte is equal to or slightly greater than an amount by volume of the second solvent (i.e., 6M LiFSI in Et2G:TFE-TFPE wherein the ratio of Et2G:TFE-TFPE ranges 50:50 to 70:50). In this preferred embodiment comprising first solvent at 50 to 70 v % fraction, the electrolyte also comprises 43 to 63 wt. % of the first solvent and 20 to 31 wt. % of one or more lithium salts.

FIG. 11 illustrates the benefits of combining multiple salts to achieve high molarity and useful capacity retention in some second solvents such as sulfolane (TMS). Specifically, when employing TMS as the second solvent with 15-30 v % of first solvent, TFE-TFPE, the capacity in mAh on the 15$^{th}$ discharge cycle (Q D15) for 250 mAh cells in groups of 5 that are cycled between 3.0 and 4.35 V increases rapidly with the inclusion of both LiTFSI and LiFSI. In this preferred, embodiment comprising first solvent at 50 to 70 v % fraction, the electrolyte comprises at least 25 wt. % of the first solvent and at least 20 wt. % of one or more lithium salts.

FIG. 12 depicts the capacity retentions of various electrolytes disclosed herein when the first solvents (i.e., low or non-coordinating solvents) is changed between TFE-TFPE and OFP-TFEE (1H,1H,5H-octafluoropentyl 1,1,2,2-tetrafluoroethyl ether) by showing the capacity in mAh on the 25$^{th}$ discharge cycle (Q D25) for 250 mAh cells that are cycled between 3.0 and 4.4 V. It is notable that these preferred embodiments demonstrate volume fractions of first solvent at less than or equal to the second solvent (i.e., 40 v %, to 50 v % of TFE-TFPE or OFP-TFEE) to equal to or slightly greater than an amount by volume of the second solvent (i.e., 50 v %, to 60 v % of TFE-TFPE or OFP-TFEE) when the molarity of the salt in the second solvent is 7-9 M. As such, the electrolyte comprises about 40 to 60 wt. % of the first solvent and about 20 to 40 wt. % of one or more lithium salts.

Specific Exemplary Examples

1. A lithium-metal electrochemical cell comprising:
a first electrode;
a second electrode, wherein metal is reversibly electrochemically deposited du ag charging of the lithium-metal electrochemical cell;
a separator disposed between the first electrode and the second electrode; and
an electrolyte comprising:
one or more first solvents, wherein each of the one or more first solvents is selected from the group consisting of low-coordinating solvents and non-polar solvents;
one or more second solvents, wherein each of the one or more second solvents is a coordinating solvent; and
one or more lithium salts an amount greater than 5 moles per liter of the one or more second solvents,
wherein an amount by volume of the first solvent in the electrolyte is less than an amount by volume of the second solvent.

2. The lithium-metal electrochemical cell of example 1, wherein the one or more first solvents comprise one or more fluorine-substituted ethers.

3. The lithium-metal electrochemical cell of any of examples 1-2, wherein the one or more first solvents comprises a fluorine substituted ether represented by the general formula I or II:

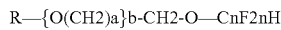        I, wherein R is —CmF2mH or —CmF2m+1, n is an integer of 2 or greater, m is an integer of 1 or greater, a is an integer of 1 or 2, and b is 0 or 1.

        II, wherein R and R' are separately represented by $C_aF_bH_c$, a is an integer of 2 or greater b and c are integers >0 with b>c.

4. The lithium-metal electrochemical cell of any of examples wherein the one or more first solvents comprise the non-polar solvent selected from the group comprising of benzene, fluorinated benzene, fluorinated alkane, toluene and fluorinated toluene.

5. The lithium-metal electrochemical cell of any of examples 1-4, wherein the one or more first solvents comprise one or more of 1,1,2,2tetrafluoroethyl 2,2,3,3tetrafluoropropyl ether (TFE-TFPE), tetrafluoroethyl 1,1,2,2-tetrafluoroethyl ether (TFE-TFPE), ethyl 1,1,2,2-tetrafluoroethyl ether (ET-TFEE), ethyl 1,1,2,3,3,3-hexafluoropropyl ether, 1,1,2,2-tetrafluoroethyl 2,2,2-trifluoroethyl ether, bis(2,2,2-trifluoroethyl) ether (BTFE), 1H,1H,5H-octafluoropentyl 1,1,2,2-tetrafluoroethyl ether (OFP-TFEE), 1,1,2,3,3,6,6,7,7-decafluoro-4-oxaheptane 1,1,2,3,3,3-hexafluoropropyl 2,2,2-trifluoroethyl ether, methoxytridecafluoroheptene and isomers thereof, heptafluoropropyl 1,2,2,2-tetrafluoroethyl ether, ethyl nonafluorobutyl ether, difluoromethyl 2,2,3,3-tetrafluoropropyl Ether, 1,1,1,2,2,3,4,5,5,5-decafluoro-3-methoxy-4-(trifluoromethyl)pentane, pentafluoroanisole, 2,3,5,6-tetrafluoroanisole, trifluoromethoxy benzene, 1-fluoro-3-(trifluoromethoxy)benzene, 1,1,2,3,3,3-hexafluoropropyl methyl ether, 1,1,2,2,3,3-hexafluoro-1-(trifluoromethoxy)-3-[(1,2,2-trifluorovinyl)oxy]propane, 1,1,2,2,3,3-hexafluoro-1,3-bis[(1,2,2-trifluorovinyl)oxy]propane, 1,3-Bis(1,1,2,2-tetrafluoroethoxy)propane, 1,2-(1,1,2,2-tetrafluoroethoxy)ethane, 1,1,1,2,3,3-hexafluoro-4-(1,1,2,3,3,3-hexafluoropropoxy-pentane, 2,3,3,4,4-pentafluorotetrahydro-5-methoxy-2,5-bis [1,2,2,2-tetrafluoro-1 - (trifluoromethyl) ethyl]-furan, methyl nonafluorobutyl ether, methyl 2,2,3,3,3-pentafluoropropyl ether, methyl 1,1 2,2-tetrafluoroethyl ether, 1-fluoro-2-(trifluoromethoxy)benzene, 3-(trifluoromethoxy)benzonitrile, hexafluorobenzene, bis(4-fluorophenyl) ether, 1,1,1,2,2,3,4,5,5,5-decafluoro-3-methoxy-4-(trifluoromethyl)pentane, difluoromethoxy)benzene, 4-(difluoromethoxy)toluene, 2-fluorotoluene, 3-flurotoluene, 4-fluorotoluene, trifluorotoluene, octafluorototuene, fluorobenzene, difluorobenzene, pentafluorobenzene, hexafluorobenzene, perfluoro-2-methylpentane, perfluoromethylcyclohexane, fluorocyclohexane, perfluoroheptane, 1,2,3,4,5,6-hexafluorocyclohexane, and a cyclohexane.

6. The lithium-metal electrochemical cell of any of examples 1-5, wherein the one or more first solvents comprise a less-coordinating solvent selected from the group comprising of BTFE, TFE-TFPE, and TFE-TFEE.

7. The lithium-metal electrochemical cell of any of examples 1-6, wherein the second solvent comprises a non-substituted ether represented by general formula III:

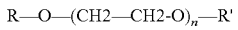        III wherein R and R' are hydrocarbon chains $C_mH_{2m+}$where m is an integer of 1 or greater, and n is an integer of 1 or greater.

8. The lithium-metal electrochemical cell of any of examples 1-7, wherein the second solvent comprises one or more of dimethoxyethane (DME), diethylene glycol dimethyl ether (diglyme), triethylene glycol dimethyl ether (triglyme), tetraethylene glycol dimethyl ether (tetraglyme), butyl diglyme, ethyl diglyme, ethylene carbonate (EC), ethyl methyl carbonate (EMC), dimethyl carbonate (DMC), propylene carbonate (PC), gamma-butyrolactone (GBL) ethyl acetate (EA), methyl difluoroacetate (MDFA), methyl butyrate (MB), tris [(2,2,2-trifluoroethyl) phosphite (TTFP), sulfolane (TMS), a carbonate ester, a acetate, a phosphite, a lactone, and a nitrile.

9. The lithium-metal electrochemical cell of any of examples 1-8, wherein the electrolyte comprises the one or more lithium salts in an amount of about 5 to about 10 moles per liter of one or more of the second solvents.

10. The lithium-metal electrochemical cell of any of examples 1-9, wherein the one or more lithium salts are selected from the group consisting of lithium bis(perfluoroalkylsulfonyl)imides, lithium bis(fluorosulfonyl)imide, lithium bis(trifluoromethanesulfonyl)imide, lithium bis(perfluoroethylsulfonyl)imide, lithium difluoro (oxalato)borate, lithium tris(oxalato) phosphate, lithium difluorophosphate, lithium difluoro-bis(oxalato)phosphate and lithium tetrafluoro (oxalato)phosphate.

11. The lithium-metal electrochemical cell of any of examples 1-10, wherein the one or more lithium salts comprise one or more of lithium hexafluorophosphate, lithium tetrafluoroborate, and lithium perchlorate in an amount less than 10 wt. % of the electrolyte.

12. The lithium-metal electrochemical cell of any of examples 1-11, wherein the one or more lithium salts comprise one or more of $LiAsF_6$, $LiNO_3$, LiI, LiSCN, $LiCF_3SO_3$, $LiN(CF_3SO_2)_2$, $LiC(SO_2CF_3)_3$, $(C_2O_4)_2$, wherein a cumulative weight percent of the one or more lithium salts s 10 wt. % percent of the electrolyte.

13. The lithium-metal electrochemical cell of any of examples 1-12, wherein the one or more lithium salts comprise at least two lithium salts, wherein the first lithium salt is selected from the group consisting of lithium bis(perfluoroalkylsulfonyl)imides, lithium bis(fluorosulfonyl)imide, lithium bis(trifluoromethanesulfonyl)imide, lithium bis(perfluoroethylsulfonyl)imide, lithium difluoro(oxalato) borate, lithium tris(oxalato)phosphate, lithium difluorophosphate, lithium difluoro-bis(oxalato)phosphate and lithium tetrafluoro(oxalato)phosphate and the second lithium salt is selected from the group consisting of $LiAsF_6$, $LiNO_3$, LiSCN, $LiCF_3SO_3$, $LiN(CF_3SO_2)_2$, $LiC(SO_2CF_3)_3$, $LiB(C_2O_4)_2$.

14. The lithium-metal electrochemical cell of example 13 wherein the electrolyte comprises between about 15 wt. % and 45 wt. % of the first lithium salt and between about 0.1 wt. % and about 10 wt. % of the second lithium salt.

15. The lithium-metal electrochemical cell of any of examples 1-14, wherein one or more salts comprise at least three elements and include two or more of the following: boron, phosphorous, fluorine, carbon, nitrogen, and oxygen.

16. The lithium-metal electrochemical cell of any of examples 1-15, wherein the one or more lithium salts comprise one or more anions selected from the group consisting of bis(perfluoroalkylsulfonyl)imides, bis(perfluoroalkylsulfonyl)methides bis(fluorosulfonyl)imide, bis(trifluoromethanesulfonyl)imide, bis(perfluoroethylsulfonyl) imide, dicyanamide, tricyanamethide, tetracyanoborate, 2,2,2,-trifluoro-N-(trifluoromethylsulfonyl)acetamide, tetrafluoroborate, triflate, bis(oxalato)borate, difluoro(oxalato)borate, perchlorate, hexafluoroarsenate, Hexafluoroantimonate, perfluorobutylsulfonate, tris(trifluoromethanesulfonyl)methide, trifluoroacetate, heptafluorobutanoate, thiocyanate, and triflinate.

17. The lithium-metal electrochemical cell of any of examples 1-16, wherein the electrolyte comprises about 3 to about 65 wt. % of the first solvent.

18. The lithium-metal electrochemical cell of any of examples 1-17, wherein the electrolyte comprises about 30 to about 65 wt. % of the first solvent.

19. The lithium-metal electrochemical cell of any of examples 1-18, wherein the electrolyte comprises about 5 to about 50 v % of the first solvent.

20. The lithium-metal electrochemical cell of any of examples 1-19, wherein the electrolyte comprises about 10 to about 45 wt. % of the second solvent.

21. The lithium-metal electrochemical cell of any of examples 1-20, wherein the electrolyte comprises about 40 to about 60 wt. % of the one or more lithium salts.

22. The lithium-metal electrochemical cell of any of examples 1-21, wherein the first electrode comprises intercalation electrode material.

23. The lithium-metal electrochemical cell of example 22, wherein the intercalation material comprises one or more materials selected from the group consisting of lithium cobalt oxide, lithium nickel manganese cobalt oxide, lithium nickel cobalt aluminum oxide, lithium iron phosphate, lithium manganese oxide, lithium nickel manganese oxide, a lithium metal oxide.

24. The lithium-metal electrochemical cell of any of examples 20-23, wherein the lithium-metal electrochemical cell charges to a voltage greater than to equal to 4.25 V.

25. The lithium-metal electrochemical cell of any of examples 20-24, wherein the lithium-metal electrochemical cell charges to a voltage greater than to equal to 4.3 V.

26. The lithium-metal electrochemical cell of any of examples 20-25, wherein the lithium-metal electrochemical cell charges to a voltage of about 4.0 to about 5.5 V.

27. The lithium-metal electrochemical cell of any of examples 20-26, wherein the lithium-metal electrochemical cell charges to a voltage of about 4.3 to about 4.6 V.

28. The lithium-metal electrochemical cell of any of examples 1-21, wherein the first electrode comprises an electrode active material, which relies predominantly upon conversion or disproportionation mechanism and charges to ≥2.0 V.

29. The lithium-metal electrochemical cell of any of examples 1-21, wherein the first electrode comprises an electrode active material, which relies predominantly upon conversion or disproportionation mechanism and charges to ≥2.2 V.

30. The lithium-metal electrochemical cell of any of examples 1-21, wherein the first electrode comprises an electrode active material, which relies predominantly upon conversion or disproportionation mechanism and charges to 2.0 V to about 4.7 V.

31. The lithium-metal electrochemical cell of any of examples 1-21, wherein the first electrode comprises an electrode active material, which relies predominantly upon conversion or disproportionation mechanism and charges to 2.2 V to about 5.0 V.

32. The lithium-metal electrochemical cell of any of examples 1-31, wherein the second electrode comprises lithium metal.

33. The lithium-metal electrochemical cell of any of examples 1-32 wherein the ratio of capacity in the first electrode relative to the second electrode is greater than or equal to four, three, two, or one.

34. The lithium-metal electrochemical cell of any of examples 1-33 wherein the ratio of capacity the first electrode relative to the second electrode is greater than or equal to one.

35. The lithium-metal electrochemical cell of any of examples 1-34 wherein the second electrode comprises lithium metal and at least one other electrochemically active material.

36. The lithium-metal electrochemical cell of examples 35, wherein the at least one other electrochemically active material comprises a metal, an alloy, an intermetallic compound, and an intercalation compound, or a combination thereof.

37. The lithium-metal electrochemical cell of any of examples 1-36, wherein the second electrode is configured to provide greater than 1000 mAh/cc.

38. The lithium-metal electrochemical cell of any of examples 1-37, wherein a pressure perpendicular to the interface of the first and second electrodes is greater than 0.06 MPa.

39. The lithium-metal electrochemical cell of any of examples 1-38, configured to charge and discharge with >99.35% Coulombic efficiency.

40. The lithium-metal electrochemical cell of any of examples 1-39, wherein the cell comprises a second ionically conducting electrolyte in solid, polymer, gel, fluid, or liquid form.

41. A battery comprising the electrochemical cell according to any of examples 1-40.

42. An electrolyte comprising:
one or more first solvents, wherein each of the one or more first solvents is selected from the group consisting of a low-coordinating solvent, a non-polar solvent, and a surfactant-type solvent;
one or more second solvents, wherein each of the one or more second solvents is a coordinating solvent; and
one or more lithium salts in an amount of greater than 5 moles per liter of one the second solvent,
wherein an amount by volume of the first solvent in the electrolyte is less than or equal to an amount by volume of the second solvent.

43. The electrolyte of example 42, wherein the one or more first solvents comprise one or more fluorine--substituted ethers.

44. The electrolyte of any of examples 42-43, wherein the one or more first solvents comprises a fluorine substituted ether represented by the general formula I or II

R—{O(CH2)a}b-CH2-O—CnF2nH    I, wherein R is —CmF2mH or CmF2m+1, n is an integer of 2 or greater, m is an integer of 1 or greater, a is an integer of 1 or 2, and b is 0 or 1.

R—O—R'    II.

wherein R and R' are separately represented y $C_aF_bH_c$, a is an integer of 2 or greater, b and c are integers >0 with b>c.

45. The electrolyte of any of examples 42-44, wherein the one or more first solvents comprise a non-polar solvent selected from the group comprising of benzene, fluorinated benzene, fluorinated alkane, toluene and fluorinated toluene.

46. The electrolyte of any of examples 42-45, wherein the one or more first solvents comprise one or more of 1,1,2,2-tetrafluoroethyl 2,2,3,3-tetrafluoropropyl ether (TFE-TFPE), tetrafluoroethyl 1,1,2,2-tetrafluoroethyl ether (TFE-TFEE, ethyl 1,1,2,2-tetrafluoroethyl ether (ET-TFEE), ethyl 1,1,2,3,3,3-hexafluoropropyl ether, 1,1,2,2-tetrafluoroethyl 2,2,2-trifluoroethyl ether, bis(2,2,2-trifluoroethyl) ether (BTFE), 1H,1H,5H-octafluoropentyl 1,1,2,2-tetrafluoroethyl ether (OFP-TFEE, 1,1,1,2,3,3,6,6,7,7-decafluoro-4-oxaheptane, 1,1,2,3,3,3-hexafluoropropyl 2,2,2-trifluoroethyl ether, methoxytridecafluoroheptene and isomers thereof, heptafluoropropyl 1,2,2,2-tetrafluoroethyl ether, ethyl nonafluorobutyl ether, difluoromethyl 2,2,3,3-tetrafluoropropyl Ether, 1,1,1,2,2,3,4,5,5,5-decafluoro-3-methoxy-4-(trifluoromethyl)pentane, pentafluoroanisole, 2,3,5,6-tetrafluoroanisole, trifluoromethoxy benzene, 1-fluoro-3-(trifluoromethoxy)benzene, 1,1,2,3,3,3-hexafluoropropyl methyl ether, 1,1,2,2,3,3-hexafluoro-1-(trifluoromethoxy)-3-[(1,2,2-trifluorovinyl)oxy]propane, 1,1,2,2,3,3-hexafluoro-1,3-bis[(1,2,2-trifluorovinyl)oxy]propane, 1,3-Bis(1,1,2,2-tetrafluoroethoxy)propane, 1,2-(1,1,2,2-tetrafluoroethoxy) ethane, 1,1,1,2,3,3-hexafluoro-4-(1,1,2,3,3,3-hexafluoropropoxy-pentane, 2,3,3,4,4-pentafluorotetrahydro-5-methoxy-bis[1,2,2,2-tetrafluoro-1-(trifluoromethyl)ethyl]-furan, methyl nonafluorobutyl ether, methyl 2,2,3,3,3-pentafluoropropyl ether, methyl 1,1,2,2-tetrafluoroethyl ether, 1-fluoro-2(trifluoromethoxy)benzene, 3-(trifluoromethoxy)benzonitrile, hexafluorobenzene, bis(4-fluorophenyl) ether, 1,1,1,2,2,3,4,5,5,5-decafluoro-3-methoxy-4-(trifluoromethyl)pentane, difluoromethoxy)benzene, 4-(difluoromethoxy)toluene, 2-fluorotoluene, 3-flurotoluene, 4-fluorotoluene, trifluorotoluene, octafluorotoluene, fluorobenzene, difluorobenzene, pentafluorobenzene, hexafluorobenzene, perfluoro-2-methylpentane, perfluoromethylcyclohexane, fluorocyclohexane, perfluoroheptane, 1,2,3,4,5,6-hexafluorocyclohexane, and a cyclohexane.

47. The electrolyte of any of examples 42-46, wherein the one or more first solvents comprise a less-coordinating solvent selected from the group comprising of BTFE, TFE-TFPE, and TFE-TFEE.

48. The electrolyte of any of examples 42-47, wherein the second solvent comprises a non-substituted ether represented by general formula III:

R—O—(CH2—CH2-O)$_n$—R'    III wherein R and R' are hydrocarbon chains $C_mH_{2m+1}$ where m is an integer of 1 or greater, and n is an integer of 1 or greater.

49. The electrolyte of any of examples 42-47, wherein the second solvent comprises one or more of dimethoxyethane (DME), diethylene glycol dimethyl ether (diglyme), triethylene glycol dimethyl ether (triglyme), tet-raethylene glycol dimethyl ether (tetraglyme), butyl dig-lyme, ethyl diglyme, ethylene carbonate (EC), ethyl methyl carbonate (EMC), dimethyl carbonate (DMC), propylene carbonate (PC), gamma-butyrolactone (GBL), ethyl acetate (EA), methyl difluoroacetate (MDFA), methyl butyrate (MB), tris[2,2,2-trifluoroethyl) phosphite (TTFP), sulfolane (TMS), a carbonate ester, a acetate, a phosphite, a lactone, and a nitrile.

50. The electrolyte of any of examples 42-49, wherein the electrolyte comprises one or more lithium salts in an amount of about 7 to about 10 moles per liter of the one or more of the second solvents.

51. The electrolyte of any of examples 42-50, wherein the one or more lithium salts are selected from the group consisting of lithium bis(perfluoroalkylsulfonyl)imides, lithium bis(fluorosulfonyl)imide, lithium bis(trifluoromethanesulfonyl)imide, lithium bis(perfluoroethylsulfonyl) imide, lithium difluoro(oxalato)borate, lithium tris(oxalato) phosphate, lithium difluorophosphate, lithium difluoro-bis (oxalato)phosphate and lithium tetrafluoro(oxalato) phosphate.

52. The electrolyte of any of examples 42-51, wherein the one or more lithium salts comprise one or more of lithium hexafluorophosphate, lithium tetrafluoroborate, and lithium perchlorate in an amount less than 10 wt. % of the electrolyte.

53. The electrolyte of any of examples 42-52, wherein the one or more lithium salts comprise one or more of $LiAsF_6$, $LiNO_3$, LiI, LiSCN, $LiCF_3SO_3$, $LiN(CF3SO_2)_2$, $LiC(SO_2CF_3)_3$, $LiB(C_2O_4)_2$, wherein a cumulative weight percent of the one or more lithium salts is <10 wt. % percent of the electrolyte.

54. The electrolyte of any of examples 42-53, wherein the one or more lithium salts comprise at least two lithium salts, wherein the first lithium salt is selected from the group consisting of lithium bis(perfluoroalkylsulfonyl)imides, lithium bis(fluorosulfonyl)imide, lithium bis(trifluoromethanesulfonyl)imide, lithium bis(perfluoroethylsulfonyl)imide, lithium difluoro(oxalato)borate, lithium tris(oxalato)phosphate, lithium difluorophosphate, lithium difluoro-bis(oxalato)phosphate and lithium tetrafluoro(oxalato)phosphate and the second lithium salt is selected from the group consisting of $LiAsF_6$, $LiNO_3$, LiI, LiSCN, $LiCF_3SO_3$, $LiN(CF_3SO_2)_2$, $LiC(SO_2CF_3)_3$, $LiB(C_2O_4)_2$.

55. The electrolyte of example 54 wherein the electrolyte comprises between about 15 wt. % and 45 wt. % of the first lithium salt and between about 0.1 wt. % and about 10 wt. % of the second lithium salt 56. The electrolyte of any of examples 42-55 wherein one or more salts comprise at least three elements and include two or more of the following: boron, phosphorous, fluorine, carbon, nitrogen, and oxygen.

57. The electrolyte of any of examples 42-56, wherein the one or more lithium salts comprise one or more anions selected from the group consisting of bis(perfluoroalkylsulfonyl)imides, bis(perfluoroalkylsulfonyl)methides, bis(fluorosulfonyl)imide, bis(trifluoromethanesulfonyl)imide, bis(perfluoroethylsulfonyl)imide, dicyanamide, tricyanomethide, tetracyanoborate, 2,2,2,-trifluoro-N-(trifluoromethylsulfonyl)acetamide, tetrafluoroborate, triflate, bis(oxalato)borate, difluoro(oxalato)borate, perchlorate, hexafluoroarsenate, Hexafluoroantimonate, perfluorobutylsulfonate, tris(trifluoromethanesulfonyl)methide, trifluoroacetate, heptafluorobutanoate, thiocyanate, and triflinate.

58. The electrolyte of any of examples 42-57, wherein the electrolyte comprises about 3 to about 65 wt. % of the first solvent.

59. The electrolyte of any of examples 42-58, wherein the electrolyte comprises about 30 to about 65 wt. % of the first solvent.

60. The electrolyte of any of examples 42-59, wherein the electrolyte comprises about 5 to about 50 v % of the first solvent.

61. The electrolyte of any of examples 42-60, wherein the electrolyte comprises about 10 to about 50 wt. % of the second solvent.

Although exemplary embodiments of the present disclosure are set forth herein, it should be appreciated that the disclosure is not so limited. For example, although the cells and electrolytes are described in connection with various specific chemistries, the disclosure is not necessarily limited to these chemistries. Various modifications, variations, and enhancements of the cells and electrolytes set forth herein can be made without departing from the spirit and scope of the present disclosure.

What is claimed is:
1. An electrolyte comprising:
one or more first solvents, wherein each of the one or more first solvents is selected from the group consisting of a low-coordinating solvent, a non-polar solvent, and a surfactant-type solvent;
one or more second solvents, wherein each of the one or more second solvents is a coordinating solvent; and
one or more lithium salts in an amount of greater than 5 moles per liter of the one or more second solvents,
wherein an amount by volume of the one or more first solvents in the electrolyte is less than or equal to an amount by volume of the one or more second solvents
wherein each of the one or more first solvents is selected from the group consisting of:
a flourine substituted ether;
a non-polar solvent selected from the group consisting of benzene, fluorinated benzene, fluorinated alkane, toluene and fluorinated toluene; and
1,1,2,2-tetrafluoroethyl 2,2,3,3-tetrafluoropropyl ether (TFE-TFPE), tetrafluoroethyl 1,1,2,2-tetrafluoroethyl ether (TFE-TFEE), ethyl 1,1,2,2-tetrafluoroethyl ether (ET-TFEE), Ethyl 1,1,2,3,3,3-hexafluoropropyl ether, 1,1,2,2-tetrafluoroethyl 2,2,2-trifluoroethyl ether, bis(2,2,2-trifluoroethyl) ether (BTFE), 1H,1H,5H-octafluoropentyl 1,1,2,2-tetrafluoroethyl ether (OFP-TFEE), 1,1,1,2,3,3,6,6,7,7-decafluoro-4-oxaheptane, 1,1,2,3,3,3-hexafluoropropyl 2,2,2-trifluoroethyl ether, methoxytridecafluoroheptene and isomers thereof, heptafluoropropyl 1,2,2,2,-tetrafluoroethyl ether, ethyl nonafluorobutyl ether, difluoromethyl 2,2,3,3-tetrafluoropropyl ether, 1,1,1,2,2,3,4,5,5,5-decafluoro-3-methoxy-4-(trifluoromethyl)pentane, pentafluoroanisole, 2,3,5,6-tetrafluoroanisole, trifluoromethoxy benzene, 1-fluoro-3-(trifluoromethoxy)benzene, 1,1,2,3,3,3-hexafluoropropyl methyl ether, 1,1,2,2,3,3-hexafluoro-1-(trifluoromethoxy)-3-[(1,2,2-trifluorovinyl)oxy]propane, 1,1,2,2,3,3-hexafluoro-1,3-bis[(1,2,2-trifluorovinyl)oxy]propane, 1,3-bis(1,1,2,2-tetrafluoroethoxy)propane, 1,2-(1,1,2,2-tetrafluoroethoxy)ethane, 1,1,1,2,3,3-hexafluoro-4-(1,1,2,3,3,3-hexafluoropropoxy)pentane, 2,3,3,4-pentafluorotetrahydro-5-methoxy-2,5-bis[1,2,2,2-tetrafluoro-1-(trifluoromethyl)ethyl]-furan, methyl nonafluorobutyl ether, methyl 2,2,3,3,3-pentafluoropropyl ether, methyl 1,1,2,2-tetrafluoroethyl ether, 1-fluoro-2-(trifluoromethoxy)benzene, 3-(trifluoromethoxy)benzonitrile, hexafluorobenzene, bis(4-fluorophenyl) ether, 1,1,1,2,2,3,4,5,5,5-decafluoro-3-methoxy-4-(trifluoromethyl)pentane, difluoromethoxy)benzene, 4-(difluoromethoxy)toluene, 2-fluorotoluene, 3-flurotoluene, 4-fluorotoluene, trifluorotoluene, octafluorotoluene, fluorobenzene, difluorobenzene, pentafluorobenzene, hexafluorobenzene, perfluoro-2-methylpentane, perfluoromethylcyclohexane, fluorocyclohexane, perfluoroheptane, 1,2,3,4,5,6-hexafluorocyclohexane, and a cyclohexane; and
wherein each of the one or more second solvents is selected from the group consisting of:
a non-substituted ether; and
dimethoxyethane (DME), diethylene glycol dimethyl ether (diglyme), triethylene glycol dimethyl ether (triglyme), tetraethylene glycol dimethyl ether (tetraglyme), butyl diglyme, ethyl diglyme, ethyl methyl carbonate (EMC), dimethyl carbonate (DMC), gamma-butyrolactone (GBL), ethyl acetate (EA), methyl difluoroacetate (MDFA), methyl butyrate (MB), tris[2,2,2-trifluoroethyl]phosphite (TTFP), sulfolane (TMS), a carbonate ester, an acetate, a phosfite, a lactone, and a nitrile.

2. The electrolyte of claim 1, wherein the fluorine substituted ether is represented by the general formula I or II:

$$R-\{O(CH_2)_a\}_b-CH_2-O-CnF_{2n}H \quad \quad I$$

wherein R is $-CmF_2mH$ or $-CmF_{2m+1}$, n is an integer of 2 or greater, m is an integer of 1 or greater, a is an integer of 1 or 2, and b is 0 or 1;

$$R-O-R' \quad \quad II$$

wherein R and R' are separately represented by $C_aF_bH_c$, a is an integer of 2 or greater, b and c are integers >0 with b>c.

3. The electrolyte of claim 1, wherein the one or more first solvents comprise a less-coordinating solvent selected from the group consisting of BTFE, TFE-TFPE, and TFE-TFEE.

4. The electrolyte of claim 1, wherein the non-substituted ether is represented by general formula III:

$$R-O-(CH_2-CH_2-O)_n-R' \quad \quad III$$

wherein R and R' are hydrocarbon chains $C_mH_{2m+1}$ where m is an integer of 1 or greater, and n is an integer of 1 or greater.

5. The electrolyte of claim 1, wherein the electrolyte comprises one or more lithium salts in an amount of about 7 to about 10 moles per liter of the one or more of the second solvents.

6. The electrolyte of claim 1, wherein the one or more lithium salts are selected from the group consisting of lithium bis(perfluoroalkylsulfonyl)imides, lithium bis(fluorosulfonyl)imide, lithium bis(trifluoromethanesulfonyl)imide, lithium bis(perfluoroethylsulfonyl)imide, lithium difluoro(oxalato)borate, lithium tris(oxalato)phosphate, lithium difluorophosphate, lithium difluoro-bis(oxalato)phosphate and lithium tetrafluoro(oxalato)phosphate.

7. The electrolyte of claim 1, wherein the one or more lithium salts exclude lithium hexafluorophosphate, lithium tetrafluoroborate, and lithium perchlorate.

8. The electrolyte of claim 1, wherein the one or more lithium salts comprise one or more of $LiAsF_6$, $LiNO_3$, LiI, LiSCN, $LiCF_3SO_3$, $LiN(CF_3SO_2)_2$, $LiC(SO_2CF_3)_3$, LiB$(C_2O_4)_2$, wherein a cumulative weight percent of the one or more lithium salts is <10 wt. % percent of the electrolyte.

9. The electrolyte claim 1, wherein the one or more lithium salts comprise at least a first lithium salt and a second lithium salt, wherein the first lithium salt is selected from the group consisting of lithium bis(perfluoroalkylsulfonyl)imides, lithium bis(fluorosulfonyl)imide, lithium bis(trifluoromethanesulfonyl)imide, lithium bis(perfluoroethylsulfonyl)imide, lithium difluoro(oxalato)borate, lithium tris(oxalato)phosphate, lithium difluorophosphate, lithium difluoro-bis(oxalato)phosphate and lithium tetrafluoro(oxalato)phosphate and the second lithium salt is selected from the group consisting of $LiAsF_6$, $LiNO_3$, LiI, LiSCN, $LiCF_3SO_3$, $LiN(CF_3SO_2)_2$, $LiC(SO_2CF_3)_3$, LiB$(C_2O_4)_2$.

10. The electrolyte of claim 9, wherein the electrolyte comprises between about 20 wt. % and 45 wt. % of the first lithium salt and between about 0.1 wt. % and about 10 wt. % of the second lithium salt.

11. The electrolyte of any of claim 1, wherein one or more salts comprise at least three elements and include two or more of the following: boron, phosphorous, fluorine, carbon, nitrogen, and oxygen.

12. The electrolyte of claim 1, wherein the one or more lithium salts comprise one or more anions selected from the group consisting of bis(perfluoroalkylsulfonyl)imides, bis (perfluoroalkylsulfonyl)methides, bis(fluorosulfonyl)imide, bis(trifluoromethanesulfonyl)imide, bis(perfluoroethylsulfonyl)imide, dicyanamide, tricyanomethide, tetracyanoborate, 2,2,2,-trifluoro-N-(trifluoromethylsulfonyl)acetamide, tetrafluoroborate, triflate, bis(oxalato)borate, difluoro(oxalato)borate, perchlorate, hexafluoroarsenate, hexafluoroantimonate, perfluorobutylsulfonate, tris(trifluoromethanesulfonyl)methide, trifluoroacetate, heptafluorobutanoate, thiocyanate, and triflinate.

13. The electrolyte of claim 1, wherein the electrolyte comprises about 30 to about 65 wt. % of the first solvent.

14. The electrolyte of claim 1, wherein the electrolyte comprises about 5 to less than 50 v % of the first solvent.

15. The electrolyte of claim 1, wherein the electrolyte comprises about 10 to less than 50 wt. % of the second solvent.

16. The electrolyte claim 1, wherein:
the electrolyte consists essentially of the one or more first solvents, the one or more second solvents, and the one or more lithium salts;
the one or more first solvents consists essentially of one or more of 1,1,2,2-tetrafluoroethyl 2,2,3,3-tetrafluoropropyl ether (TFE-TFPE), tetrafluoroethyl 1,1,2,2-tetrafluoroethyl ether (TFE-TFEE), ethyl 1,1,2,2-tetrafluoroethyl ether (ET-TFEE), ethyl 1,1,2,3,3,3-hexafluoropropyl ether, 1,1,2,2-tetrafluoroethyl 2,2,2-trifluoroethyl ether, bis(2,2,2-trifluoroethyl) ether (BTFE), 1H,1H,5H-octafluoropentyl 1,1,2,2-tetrafluoroethyl ether (OFP-TFEE), 1,1,1,2,3,3,6,6,7,7-decafluoro-4-oxaheptane, 1,1,2,3,3,3-hexafluoropropyl 2,2,2-trifluoroethyl ether, methoxytridecafluoroheptene and isomers thereof, heptafluoropropyl 1,2,2,2-tetrafluoroethyl ether, ethyl nonafluorobutyl ether, difluoromethyl 2,2,3,3-tetrafluoropropyl ether, 1,1,1,2,2,3,4,5,5,5-decafluoro-3-methoxy-4-(trifluoromethyl)
pentane, pentafluoroanisole, 2,3,5,6-tetrafluoroanisole, trifluoromethoxy benzene, 1-fluoro-3-(trifluoromethoxy)benzene, 1,1,2,3,3,3-hexafluoropropyl methyl ether, 1,1,2,2,3,3-hexafluoro-1-(trifluoromethoxy)-3-[(1,2,2-trifluorovinyl)oxy]propane, 1,1,2,2,3,3-hexafluoro-1,3-bis[(1,2,2- trifluorovinyl)oxy] propane, 1,3-bis(1,1,2,2-tetrafluoroethoxy)propane, 1,2-(1,1,2,2-tetrafluoroethoxy)ethane, 1,1,1,2,3,3-hexafluoro-4-(1,1,2,3,3,3-hexafluoropropoxy-pentane, 2,3,3,4,4-pentafluorotetrahydro-5-methoxy-2,5-bis[1, 2,2,2-tetrafluoro-1-(trifluoromethyl)ethyl]-furan,
methyl nonafluorobutyl ether, methyl 2,2,3,3,3-pentafluoropropyl ether, methyl 1,1,2,2-tetrafluoroethyl ether, 1-fluoro-2-(trifluoromethoxy)benzene, 3-(trifluoromethoxy)benzonitrile, hexafluorobenzene, bis(4-fluorophenyl) ether, 1,1,1,2,2,3,4,5,5,5-decafluoro-3-methoxy-4-(trifluoromethyl)pentane, difluoromethoxy) benzene, 4-(difluoromethoxy)toluene, 2-fluorotoluene, 3-flurotoluene, 4-fluorotoluene, trifluorotoluene, octafluorotoluene, fluorobenzene, difluorobenzene, pentafluorobenzene, hexafluorobenzene, perfluoro-2-methylpentane, perfluoromethylcyclohexane, fluorocyclohexane, perfluoroheptane, 1,2,3,4,5,6-hexafluorocyclohexane, and a cyclohexane; and
the second solvent consists of one or more of dimethoxyethane (DME), diethylene glycol dimethyl ether (diglyme), triethylene glycol dimethyl ether (triglyme), tetraethylene glycol dimethyl ether (tetraglyme), butyl diglyme, ethyl diglyme, ethyl methyl carbonate (EMC), dimethyl carbonate (DMC), gamma-butyrolactone (GBL), ethyl acetate (EA), methyl difluoroacetate (MDFA), methyl butyrate (MB), tris[2,2,2-trifluoroethyl phosphite (TTFP), sulfolane (TMS), an acetate, a phosphite, a lactone, and a nitrile.

17. The electrolyte of claim 1, wherein the one or more lithium salts consists essentially of
   lithium bis(fluorosulfonyl)imide ($LiF_2NO_4S_2$) (LiFSI) salt in an amount of greater than 5 moles per liter of the one or more second solvents.

* * * * *

UNITED STATES PATENT AND TRADEMARK OFFICE
CERTIFICATE OF CORRECTION

PATENT NO. : 11,063,297 B2
APPLICATION NO. : 16/226333
DATED : July 13, 2021
INVENTOR(S) : Newhouse et al.

It is certified that error appears in the above-identified patent and that said Letters Patent is hereby corrected as shown below:

In the Claims

Column 22, Line 16, Claim 1, the word "flourine" should be replaced with the word "fluorine".

Column 23, Line 5, Claim 1, the word "phosfite" should be replaced with the word "phosphite".

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*